US011415107B2

United States Patent
Ma

(10) Patent No.: US 11,415,107 B2
(45) Date of Patent: Aug. 16, 2022

(54) WIND POWER GENERATION APPARATUS, TOWER AND METHOD FOR SUPPRESSING TOWER SHADOW EFFECT OF TOWER

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 973 days.

(21) Appl. No.: 16/094,880

(22) PCT Filed: Mar. 19, 2018

(86) PCT No.: PCT/CN2018/079415
§ 371 (c)(1),
(2) Date: Oct. 18, 2018

(87) PCT Pub. No.: WO2019/047501
PCT Pub. Date: Mar. 14, 2019

(65) Prior Publication Data
US 2021/0231106 A1 Jul. 29, 2021

(30) Foreign Application Priority Data

Sep. 11, 2017 (CN) .......................... 201710812909.0

(51) Int. Cl.
*E04B 1/34* (2006.01)
*F03D 13/20* (2016.01)
(Continued)

(52) U.S. Cl.
CPC ............. *F03D 13/20* (2016.05); *E04H 12/00* (2013.01); *F15D 1/12* (2013.01); *F16F 15/027* (2013.01);
(Continued)

(58) Field of Classification Search
CPC ............................ E04H 12/342; E04H 12/00
See application file for complete search history.

(56) References Cited

U.S. PATENT DOCUMENTS

| 6,676,122 B1 * | 1/2004 | Wobben | F03D 9/25 |
| | | | 290/55 |
| 7,161,260 B2 * | 1/2007 | Kruger-Gotzmann | ....................... |
| | | | H02K 7/1823 |
| | | | 290/55 |

(Continued)

FOREIGN PATENT DOCUMENTS

| AU | 2009213058 A1 | 3/2010 |
| CN | 1705822 A | 12/2005 |

(Continued)

OTHER PUBLICATIONS

International Search Report and Written Opinion in corresponding PCT Application No. PCT/CN2018/079415, dated Jun. 21, 2018, 10 pages.

(Continued)

*Primary Examiner* — Basil S Katcheves
(74) *Attorney, Agent, or Firm* — Bayes PLLC

(57) ABSTRACT

A wind power generation apparatus, a tower and a method for suppressing a tower shadow effect of the tower. The tower is provided with suction through holes extending through a circumferential wall thereof, and the suction through holes are distributed in a circumferential direction of the tower; the tower is further provided with a suction apparatus, and the suction apparatus can perform suction to the suction through holes from outside to inside. With the (Continued)

tower and the method, when the suction through holes at a windward side are suctioned, the adverse influence of the tower shadow effect can be weakened or eliminated, a service life of a pitch varying bearing can be prolonged, a noise can be reduced and a wind energy utilization coefficient can be improved. When the suction through holes at a position of a bypassing flow detachment are suctioned, vortex-induced vibrations can also be suppressed.

20 Claims, 15 Drawing Sheets

(51) Int. Cl.
*F15D 1/12* (2006.01)
*F16F 15/027* (2006.01)
*E04H 12/00* (2006.01)
*E04C 3/08* (2006.01)
*E04H 12/34* (2006.01)

(52) U.S. Cl.
CPC .............. *E04C 3/08* (2013.01); *E04H 12/342* (2013.01); *F05B 2260/96* (2013.01); *F05B 2270/32* (2013.01); *F16F 2222/12* (2013.01); *F16F 2230/18* (2013.01); *F16F 2230/36* (2013.01)

(56) References Cited

U.S. PATENT DOCUMENTS

| | | | |
|---|---|---|---|
| 7,365,447 B2* | 4/2008 | Yoshida | F15D 1/12 290/55 |
| 8,047,774 B2* | 11/2011 | Bagepalli | H02K 9/19 310/58 |
| 8,476,784 B2* | 7/2013 | Sato | F03D 1/0691 415/908 |
| 9,127,648 B2* | 9/2015 | Sabhapathy | F03D 80/80 |
| 9,228,566 B2* | 1/2016 | Pasteuning | F03D 80/60 |
| 2006/0245928 A1 | 11/2006 | Herbst | |
| 2006/0290140 A1* | 12/2006 | Yoshida | F03D 13/20 290/55 |
| 2011/0142629 A1* | 6/2011 | Pesetsky | F03D 1/0675 416/23 |
| 2011/0142671 A1* | 6/2011 | Fritz | F03D 80/30 324/511 |
| 2011/0211952 A1* | 9/2011 | Chouhan | F03D 1/0683 416/1 |
| 2011/0229321 A1* | 9/2011 | Kilaras | F03B 17/061 137/561 A |
| 2014/0154048 A1* | 6/2014 | Lin | F01D 25/12 415/177 |
| 2016/0107746 A1* | 4/2016 | Tiwari | B64C 21/06 219/121.72 |

FOREIGN PATENT DOCUMENTS

| | | |
|---|---|---|
| CN | 202991359 U | 6/2013 |
| CN | 106224181 A | 12/2016 |
| CN | 106640554 A | 5/2017 |
| CN | 107387335 A | 11/2017 |
| CN | 107605666 A | 1/2018 |
| EP | 2161446 A1 | 3/2010 |
| EP | 2568170 A1 | 3/2013 |

OTHER PUBLICATIONS

Supplementary European Search Report in corresponding European Application No. EP 18 78 8657, dated Jul. 25, 2019, 6 pages.

* cited by examiner

WIND POWER GENERATION APPARATUS, TOWER AND METHOD FOR SUPPRESSING TOWER SHADOW EFFECT OF TOWER

RELATED APPLICATIONS

This application is the national phase of International Application No. PCT/CN2018/079415, titled "WIND POWER GENERATION APPARATUS, TOWER AND METHOD FOR SUPPRESSING TOWER SHADOW EFFECT OF TOWER", filed on Mar. 19, 2018, which claims the priority to Chinese Patent Application No. 201710812909.0, titled "WIND POWER GENERATION APPARATUS, TOWER AND METHOD FOR SUPPRESSING TOWER SHADOW EFFECT OF TOWER", filed with the State Intellectual Property Office of People's Republic of China on Sep. 11, 2017, the entire disclosures of the above-identified applications are incorporated herein by reference.

FIELD

The present application relates to the field of tower technology, and in particular to a wind power generation apparatus, a tower and a method for suppressing a tower shadow effect of the tower.

BACKGROUND

Reference is made to FIG. 1-1, which is a schematic view showing the configuration of a wind power generation apparatus.

The base of the wind power generation apparatus is a tower 10, which carries and encloses the entire system. Taking the tower 10 having a circular section as an example, the tower 10 may be a steel tower or a steel tower in combination with a concrete tower. The tower 10 carries a nacelle 30, a power generator, and a rotor 20 of the wind power generation apparatus. Tasks of acquiring wind energy and converting it into electric energy are performed by the rotor 20 and the generator. The converted electric energy is transmitted through a power transmission cable 40 or a power transmission busbar. The power transmission cable 40 shown in the figure is led out from the nacelle 30 and is position-limited by a cable retaining ring which is at a top of the tower 10 and is fixed to a cable retaining ring fixing plate 50, and the power transmission cable 40 then passes a saddle bracket 60 and is suspended along an inner wall of the tower 100 to a converter cabinet 70. A tower door 80 is further provided at a lower end of the tower 10.

The electric energy obtained by the conversion is controlled by a switch cabinet of the wind turbine generator system and is transported, by means of the power transmission cable 40 or the power transmission busbar, to a converter (in the converter cabinet 70) performing the electric power conversion task, and then after being processed by the converter, the electric energy meeting the requirements of power grid access rule can be obtained. Therefore, the tower 10 of the wind power generation apparatus can be regarded as a tower pole for wind power generation, and mainly plays a supporting role in the wind power generation apparatus.

Moreover, the tower 10 bears wind loads of structures generated by the nacelle 30, the rotor 20 and the generator, or the downwind vibrations and crosswind vibrations induced by the wind loads of structures, i.e., wind-induced structure vibration issues.

Currently, in the process of operation of the tower 10, the junction between a root of a blade of the rotor 20 and the pitch varying bearing is apt to be damaged due to fatigue, and noise destroying ecology may be generated during the rotation of the rotor 20.

In addition, reference is made to FIG. 1-2, which is a schematic view showing hoisting of the tower in segments.

Currently, the tower 10 is generally installed in segments, as an example, from bottom to top, a first tower segment 11, a second tower segment 12, a third tower segment 13, a fourth tower segment 14 and a fifth tower segment 15 are sequentially arranged as shown in FIG. 1-2. In the process of installing the wind power generation apparatus, the first tower segment 11 is installed on a ground foundation 90 of the tower 10 first, then other tower segments are hoisted segment by segment, and after the tower segments are connected one another, the top (the fifth tower segment 15 in FIG. 1-2) of the tower 10 is connected to a yaw system of the nacelle 30, and the nacelle 30 is butted to the power generator, and the power generator (or a gear box) is then butted to the rotor 20.

The specific hoisting process is described as follows.

Before hoisting the tower 10, a foundation ring of the ground foundation 90 connected to the first tower segment 11 is cleaned first, and multiple bolts (such as 120 bolts) are placed at an inner ring of the foundation ring after threads of the bolts are oiled, and meanwhile, a control cabinet of the wind power generation apparatus is hoisted into the foundation ring;

a hoisting tool is mounted at an upper end of the first tower segment 11, where hoisting the first tower segment 11 at the upper end thereof is performed by a main hoist, and at the same time, a hoisting tool is also mounted at a lower end of the first tower segment 11, and the task of hoisting the first tower segment at the lower end thereof is performed by an auxiliary hoist for the tower. The two hoists hoist at the same time. When the altitude of the first tower segment 11 is greater than a maximum diameter of the first tower segment 11, the main hoist hoists the upper end of the first tower segment 11, and the auxiliary hoist stops working; when the first tower segment 11 is hoisted to the position perpendicular to the ground, the auxiliary hoist is removed, and the hoisting tool at the lower end of the first tower segment 11 is removed;

after a flange surface of the first tower segment 11 is connected, the bolts are passed from bottom to top, and nuts are pre-mounted and then tightened by means of an electric wrench. The nuts are tightened for at least 3 times (till the hoisting procedure of the entire wind power generation apparatus is finished, the nuts for tower connection are then tightened by means of a torque wrench to achieve a required torque value); and the hoisting processes of the rest tower segments are the same as that of the first tower segment 11, and after the hoisting of the uppermost tower segment is finished, it is prepared to hoist the nacelle.

The above installation procedures of butting and connection are all carried out under conditions of unpredictable local winds in a small regional environment of a wind farm. Therefore, during the hoisting and installation processes, gusts of varying strength or continuous light wind are often encountered. As described above, these gusts or continuous wind may induce vibrations of the tower, disrupt the stability of the tower, and endanger the on-site personnel and equipment, and delay the installation period. For example, after the fourth tower segment 14 is hoisted, the fourth tower segment 14 may vibrate, such that the fifth tower segment 15 cannot be aligned with the fourth tower segment 14; and the fastened bolts may even be broken under the action of vibrations, thereby endangering the safety.

At present, it is clearly stipulated by the project safety requirements for the hoisting process in the wind power industry that, the hoisting of a blade group is prohibited when the wind speed is greater than 6 m/s; the hoisting of the nacelle is strictly prohibited when the wind speed is greater than 8 m/s, and the hoisting of the tower is strictly prohibited when the wind speed is greater than 10 m/s. Accordingly, the on-site hoisting progress and installation period are obviously limited by the wind conditions in the local region. For the construction of wind farms at high-altitude and high-mountain regions, the project duration is even more apt to be adversely affected.

Reference is made to FIGS. 2 to 3-6. FIG. 2 is a schematic view showing the structure of a tower having a certain vibration suppression function in the conventional technology; FIG. 3-1 to FIG. 3-6 are schematic views showing the relationships between vortex shedding from a cylinder (by-passing flow detachment) and six intervals of Reynolds number. From FIG. 3-1 to FIG. 3-6, the six intervals of Reynolds number (Re) are respectively Re<5, 5<Re<15, 40<Re<150, 150<Re<$3 \times 10^5$, $3 \times 10^5$<Re<$3 \times 10^6$, and Re>$3 \times 10^6$.

According to different patterns of flowing of airflow around structures of objects, the structures are sorted into blunt bodies and streamlined bodies such as aircraft wings or a sails.

When Re<5, the fluid flows while adhering to an entire surface of a cylinder, i.e., the fluid flows without being detached from the surface of the cylinder.

When 5<Re<40, the flowing is still symmetrical, but detachment occurs in the flowing, and two symmetrically arranged stable vortexes are formed on a leeward side, and the vortexes are elongated outwards as the Reynolds number increases, resulting in deformation of the vortexes.

When 40<Re<150, starting from that Reynolds number Re=40, the vortexes will alternately shed from a rear side of the surface of the cylinder and flow into the fluid near the back of the cylinder to form a shear layer. The unstable shear layer soon rolls into vortexes and flows downstream, forming the Karman vortex street, i.e., the vortex-induced vibration. In this case, he vortex shedding is regular and periodic.

When 150<Re<300, which corresponds to a transition period from laminar flow to turbulent flow, during this period, the periodic vortex shedding is covered by irregular turbulent flow.

When 300<Re<$3 \times 10^5$, which is referred to as a subcritical region, a wake flow of the cylinder after detachment is mainly presented as a turbulent wake flow, the vortex shedding begins to be irregular, and the period of vortex shedding frequency can be roughly defined, however, the disturbing force during vortex shedding is random rather than symmetrical.

When $3 \times 10^5$<Re<$3 \times 10^6$, which is referred to as a supercritical region, the vortex shedding point moves backwards, and the vortex street cannot be identified, and becomes a completely non-periodic vortex.

When $3 \times 10^6$<Re, which is referred to as a trans-critical region, the wake flow at the rear side of the cylinder is very turbulent, however, a regular vortex shedding also appears.

When uniform airflow passes by (sweeps horizontally, flows around) a blunt body (cylindrical body), the periodic vortex shedding generated at the back of the section of the cylinder may produce a periodically varying action force, i.e., a vortex-induced force, on a structure (the contact surface of the tower). A lower end of the tower structure around which the airflow flows and the underground foundation constitute a single free end vibration system (i.e., an upper end of the tower is submerged in the airflow, and a lowermost end of the tower is fixed on the ground foundation). When the vortex shedding frequency consists with a certain order natural frequency of the tower structure, the periodic vortex-induced force (unbalanced force) subjected by the tower surface may cause a response of the vortex-induced vibration of the tower system structure.

The condition that the vortex shedding frequency is equal to the natural frequency of the vibration system of the tower of the structural system and the foundation thereof can be met only at a certain wind speed. However, the vibration system of the tower and the foundation thereof which has the natural frequency may have a certain feedback effect on the vortex shedding, to allow the frequency of the vortex shedding to be "captured" by the vibration frequency of the vibration system of the tower and the foundation thereof within a certain wind speed range, so that the vortex shedding frequency may not change with the changing of the wind speed within this wind speed range. This phenomenon is referred to as locking, and the locking may expand the wind speed range within which the vortex-induced resonance of the tower structure occurs.

The height of the tower of a modern large-scale megawatt-level wind turbine generator system can reach 60 m to 100 m. Main components such as a main frame, a sub-frame, a hub and blades (i.e., the rotor 20) and the like are mounted at the top of the tower 10. When the wind turbine generator system is in operation, in addition to the gravity of the components at the top of the tower 10 and the dynamic load generated by the rotation of the rotor, the tower 10 is impacted by the natural wind, including downwind and crosswind impacting forms. Bending moments and forces are applied onto the tower when the wind blows the rotor to rotate. The bending moments and forces generated in downwind direction are the main reasons for the damage of the tower 10. The vortexes generated when the wind flow around the tower 10 may also cause transverse vibrations leading to the resonance damage of the tower 10.

When the wind blows over the tower 10, pairs of antisymmetrical vortexes arranged alternately and rotating in opposite directions, i.e., Karman vortexes are generated at left and right sides of the wake flow. The vortexes shed from the tower 10 at a certain frequency, to cause the transverse vibration perpendicular to the wind direction of the tower 10, which is also referred to as wind-induced transverse vibration, i.e., the vortex-induced vibration. When the vortex shedding frequency is close to the natural frequency of the tower, the tower 10 is apt to be resonated and therefore be damaged.

In FIG. 2, a spiral wire 10*a* (or a spiral plate) is wound around an outer wall of the tower 10, to suppress vortex shedding occurred on the surface of the tower 10. The spiral wire 10*a* (or the spiral plate) has different transverse vibration suppression effects when being arranged at different screw pitches. The increase of the height of the spiral wire 10*a* is beneficial for breaking a period of the vortex street releasing, thus the generation and release of the vortex street are more irregular, which facilitates the suppression for the vortex-induced vibrations. Moreover, the noise and resistance generated in front and at the back of the tower are also gradually increased, and pitching vibration amplitude along the wind direction may be increased.

The above technical solution of the spiral wire 10*a* has the following technical issues.

The wind speed of the airflow may change, and on condition that the spiral wire 10a (or the spiral plate) is machined to have its feature parameters (screw pitch, height) to change according to the change of the wind speed of the airflow, the corresponding manufacturing cost and maintenance cost may be increased significantly.

The coverage rate of the spiral wire 10a (or the spiral plate) on the tower surface may affect the effect of transverse vibration suppression. When the coverage rate reaches (or exceeds) 50%, the optimal effect of transverse vibration suppression is achieved. However, in this case, the serious adverse effects of the wind-induced noise caused by the spiral wire 10a (or the spiral plate) and the airflow on the organisms in the natural environment are prohibited by the ecological regulations.

The spiral wire 10a (or the spiral plate) is mounted only for the use in the hoisting stage, which has a reduced significance and loses a lot. Considering the long-term operation and use, it is difficult for the spiral wire to adapt to the changes of wind speed and cope with different wind speeds for the requirements of installation cost and environmental protection, i.e., the spiral wire can hardly play its role at various wind speeds.

In view of this, a technical issue to be addressed by those skilled in the art is to improve the operation or installation situation of the wind power generation apparatus.

SUMMARY

In order to address the above technical issues, a tower and a method for suppressing a tower shadow effect of the tower are provided according to the present application, which can improve the operation or installation situation of a wind power generation apparatus.

A tower according to an embodiment of the present application is provided with suction through holes extending through a circumferential wall thereof, the suction through holes are distributed in a circumferential direction of the tower, the tower is further provided with a suction apparatus, and the suction apparatus is capable of performing suction to the suction through holes from outside to inside.

A method for suppressing a tower shadow effect of a tower is further provided according to this embodiment. The method includes providing suction through holes extending through a circumferential wall of the tower in a circumferential direction thereof, and performing suction to the suction through holes from outside to inside.

A wind power generation apparatus is further provided according to an embodiment of the present application, including a tower and a nacelle, a generator and a rotor which are located at the top of the tower, wherein the tower is the tower according to any one of the above solutions.

With the tower and method according to the above embodiments, when the suction through holes at the windward side are suctioned, thereby weakening or eliminating the adverse effect of the tower shadow effect, prolonging the service life of the pitch varying bearing, reducing the noise and improving the wind energy utilization coefficient. When the suction through holes at the position of the bypassing flow detachment are suctioned, vortex-induced vibrations can also be suppressed. Compared with the method of using the spiral wire in the background technology, it is obvious that the method of suctioning the suction through holes, by means of adsorbing the boundary layer, directly suppresses or prevents the cause of the vortex-induced vibrations, which has a better vibration suppression effect. In addition, the suction intensity may be adjusted at any time during suctioning according to the vibration state, thus achieving a higher flexibility without requiring a higher cost. Moreover, compared with the noise generated when the upwind incoming flow comes into contact with the spiral wire in the background technology, obviously, the noise generated in suctioning the suction through holes may be significantly smaller, and can meet the requirements of ecological regulations. Furthermore, the suction method can always function to suppress the vortex-induced vibrations whether in the hoisting process or in the operation process of the wind turbine generator system. When the suctioned airflow is discharged to the inside of the tower, functions of cooling by heat exchange, blocking the rainwater, sand or dust and the like from entering a flow guiding hood or a hub may also be performed.

BRIEF DESCRIPTION OF THE DRAWINGS

FIG. 1-2 is a schematic view showing that a tower is hoisted in segments;

FIG. 2 is a schematic view showing the structure of a tower having a certain function of suppressing vibrations;

FIGS. 3-1 to 3-6 are schematic views showing the relationships between vortex shedding from a cylinder (bypassing flow detachment) and six intervals of Reynolds number respectively;

FIG. 4 is a schematic view showing the structure of a specific embodiment of a tower having a function of suppressing vortex-induced vibrations according to the present application;

FIG. 5 is a schematic view showing an upper part, provided with suction through holes, of the tower in FIG. 4 being expanded;

FIG. 6 is a schematic view showing a tower shadow effect of a tower;

Figure 1:
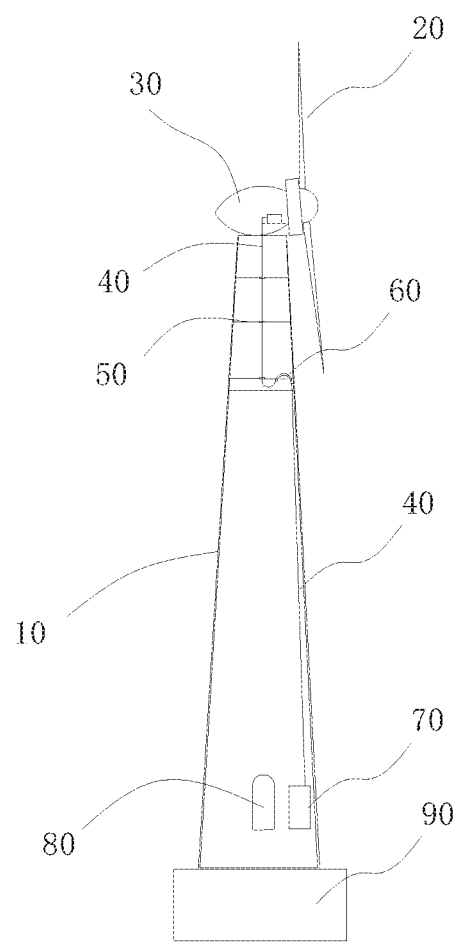
FIG. 1-1 is a schematic view showing the configuration of a wind power generation apparatus.
Figures 1, 2:
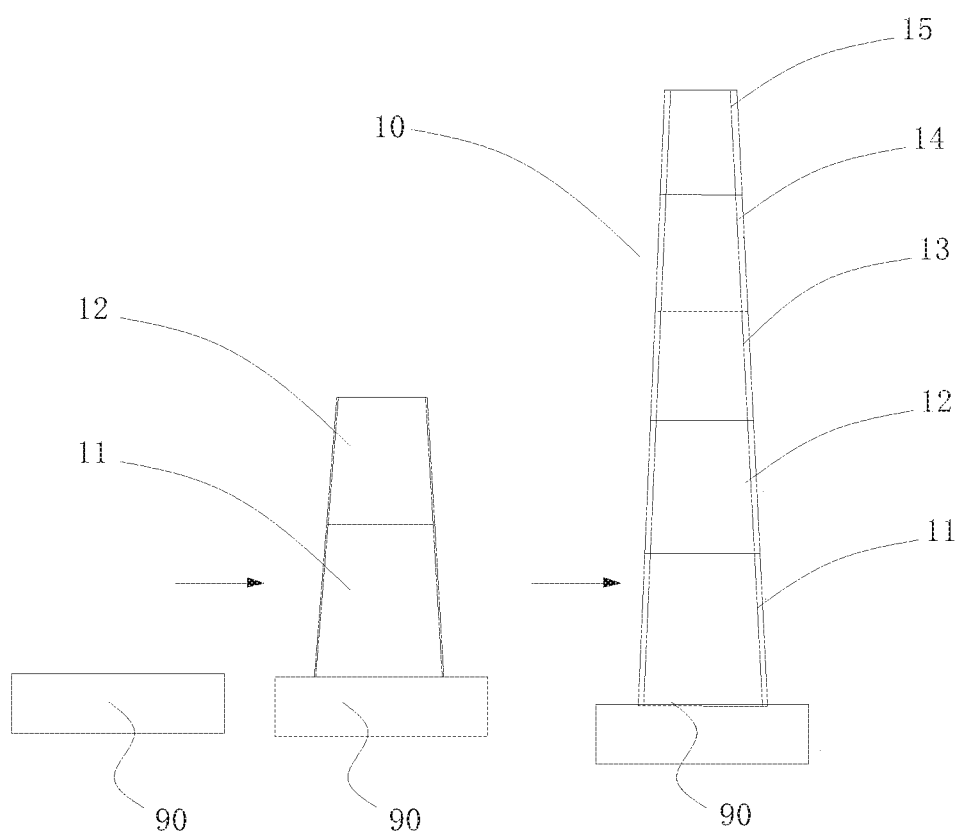
Figure 2:
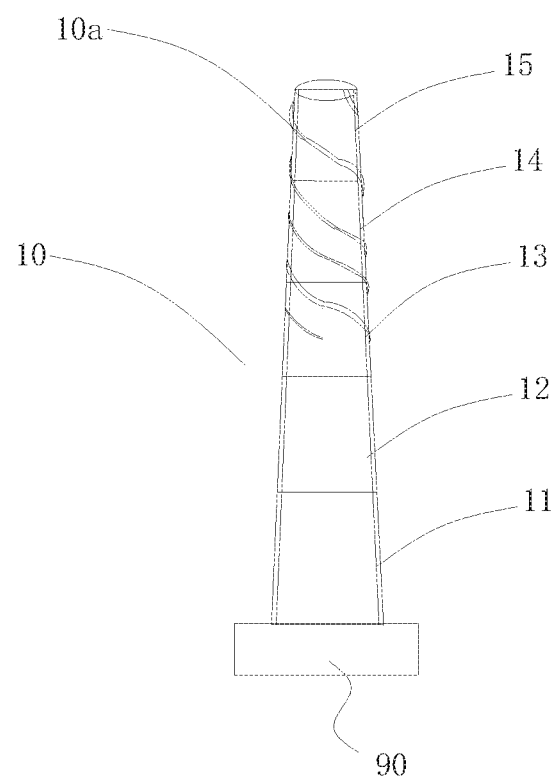
Figure 18:
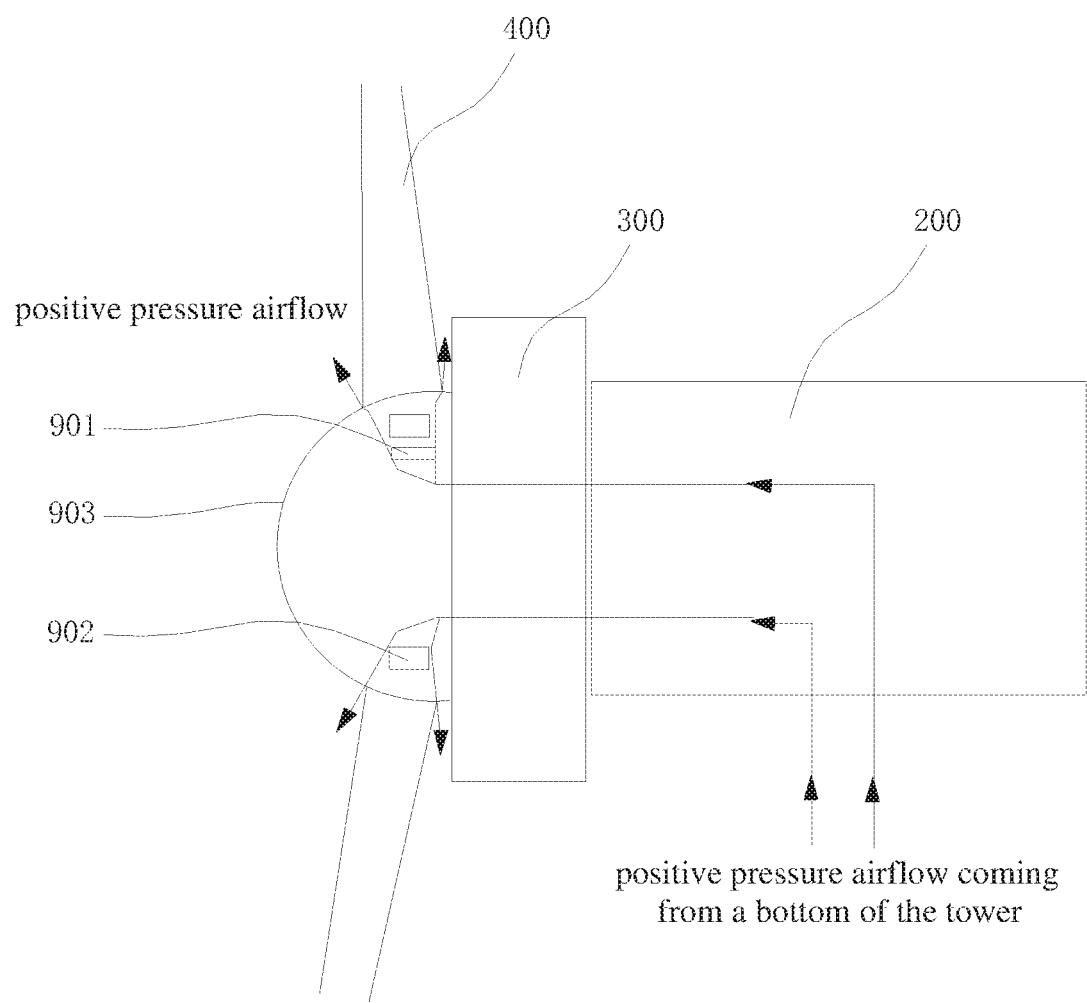
FIG. 18 is a schematic view showing an airflow path of the discharged airflow in FIG. 4 after the airflow rises to the top of the tower.

Reference numerals in FIGS. 1-1 to 18 are as follows:

| | | | |
|---|---|---|---|
| 10 | tower, | 11 | first tower segment, |
| 12 | second tower segment, | 13 | third tower segment, |
| 14 | fourth tower segment, | 15 | fifth tower segment, |
| 10a | spiral wire, | 20 | rotor, |
| 30 | nacelle, | 40 | power transmission cable, |
| 50 | cable retaining ring fixing plate, | 60 | saddle bracket, |
| 70 | converter cabinet, | 80 | tower door, |
| 90 | ground foundation; | | |
| 100 | tower, | 100a | suction through hole, |
| 100b | temperature sensing channel, | 100c | pressure sensing channel; |
| 200 | nacelle, | 300 | power generator, |
| 400 | rotor; | | |
| 500a | suction opening, | 500b | air discharge opening, |
| 501 | air suction machine, | 502 | transport pipeline, |
| 503 | air discharge conflux main pipe, | 504 | suction conflux main pipe, |
| 505 | electric control valve; | | |
| 600 | tower foundation; | | |
| 701 | shell, | 702 | partition, |
| 703 | air filtration section, | 704 | suction chamber; |
| 801 | thermal insulation layer, | 802 | temperature sensing element, |
| 802a | lead end, | 803 | vibration monitoring device, |
| 804 | pressure sensing element, | 804a | lead end; |
| 901 | pitch varying servo motor, | 902 | flow guiding hood, |
| 903 | electric control cabinet; | | |
| R1 | gradually convergent flow channel, | | |
| R2 | throat portion, | | |
| R3 | gradually divergent flow channel. | | |

DETAILED DESCRIPTION OF EMBODIMENTS

For those skilled in the art to better understand the technical solutions of the present application, the present application is described further in detail hereinafter with reference to the drawings and embodiments.

Figures 1, 3:
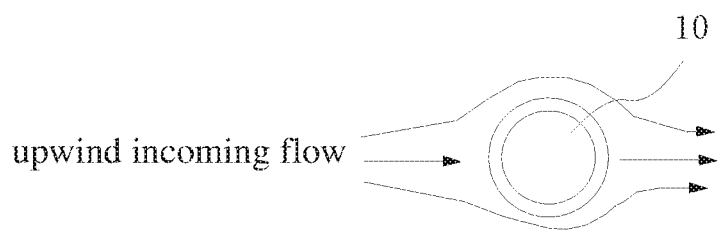
Figures 2, 3:
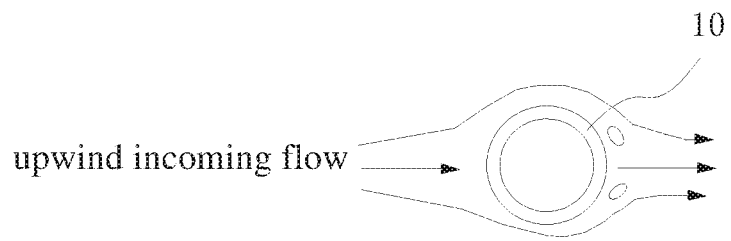
Figure 3:
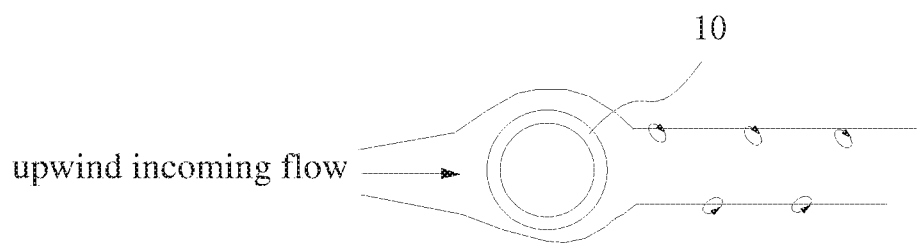
Figures 3, 4:
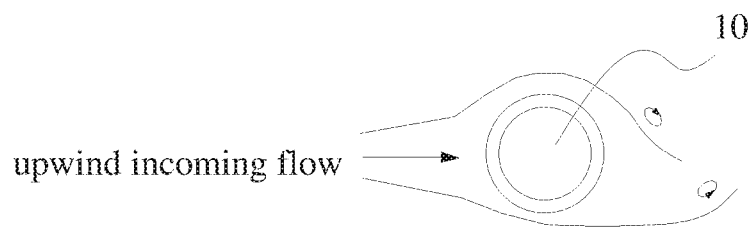
Figures 3, 4, 5:
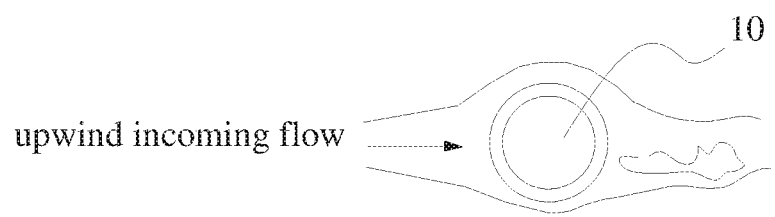

Referring to FIG. 4, FIG. 4 is a schematic view showing the structure of a specific embodiment of a tower according to the present application. FIG. 5 is a schematic view showing an upper part, provided with suction through holes, of the tower in FIG. 4 being expanded, that is, an annular upper part of the tower 100 is expanded to be in a bar shape to facilitate illustration.

As shown in FIG. 4, the tower 100 is arranged on a tower foundation 600, and components such as a nacelle 200, a power generator 300, a rotor 400 and the like are mounted at a top of the tower 100. As shown in FIG. 5, in this embodiment, an upper part of the tower 100 is provided with a plurality of suction through holes 100a extending through a circumferential wall of the tower 100, and the plurality of suction through holes 100a are distributed in a circumferential direction of the tower 100, that is, distributed around the tower 100. In addition, a suction apparatus is further provided, and the suction apparatus can suction the suction through holes 100a from outside to inside. Here, "from outside to inside" is intended to limit a direction of suction rather than limit the position of the suction apparatus, that is, when the suction is performed, the airflow flows from the outside to the inside of the tower, and thus, the suction apparatus may be placed inside the tower 100, and of course, the suction apparatus may also be placed outside the tower 100. When the suction through holes 100a are suctioned, since the suction through holes 100a extend through the circumferential wall of the tower 100, the airflow at an outer surface of the tower 100 can be suctioned.

Figures 3, 4, 5, 6:
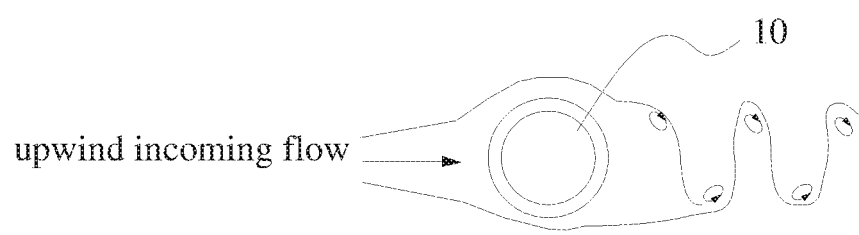
Figure 4:
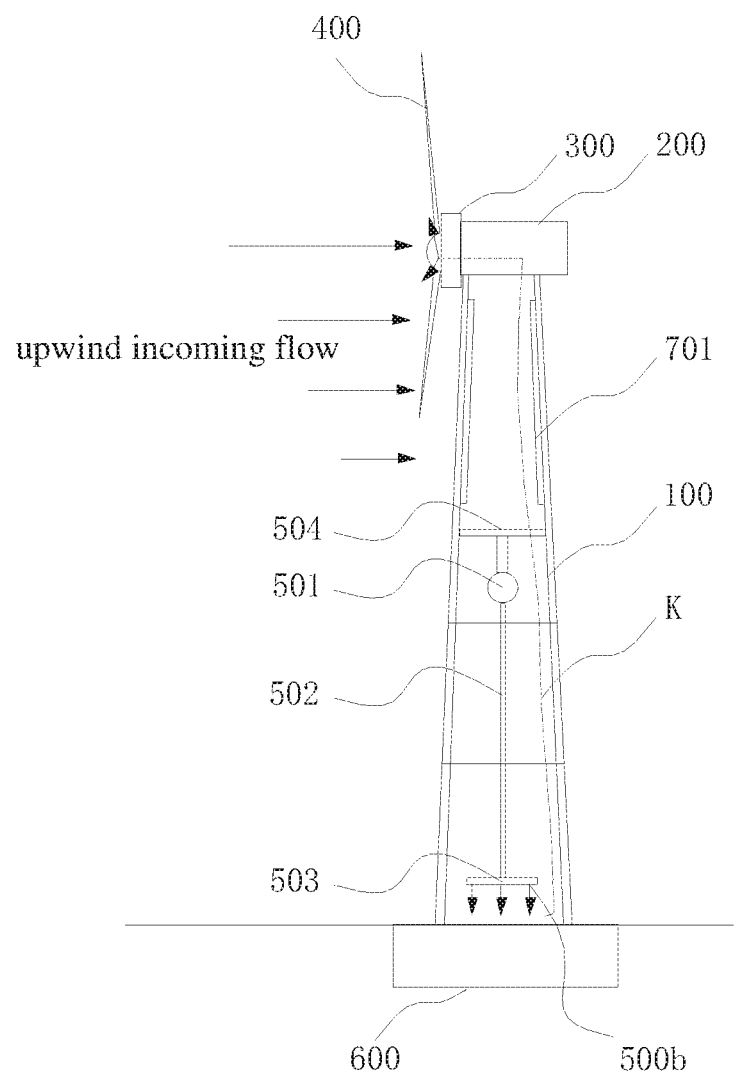
Figure 5:
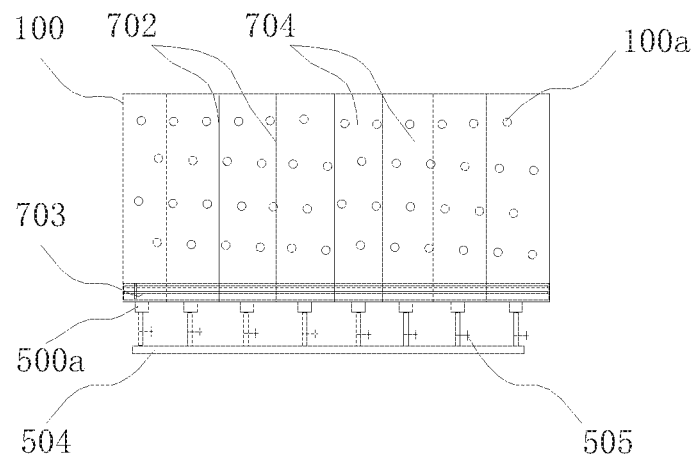
Figure 6:
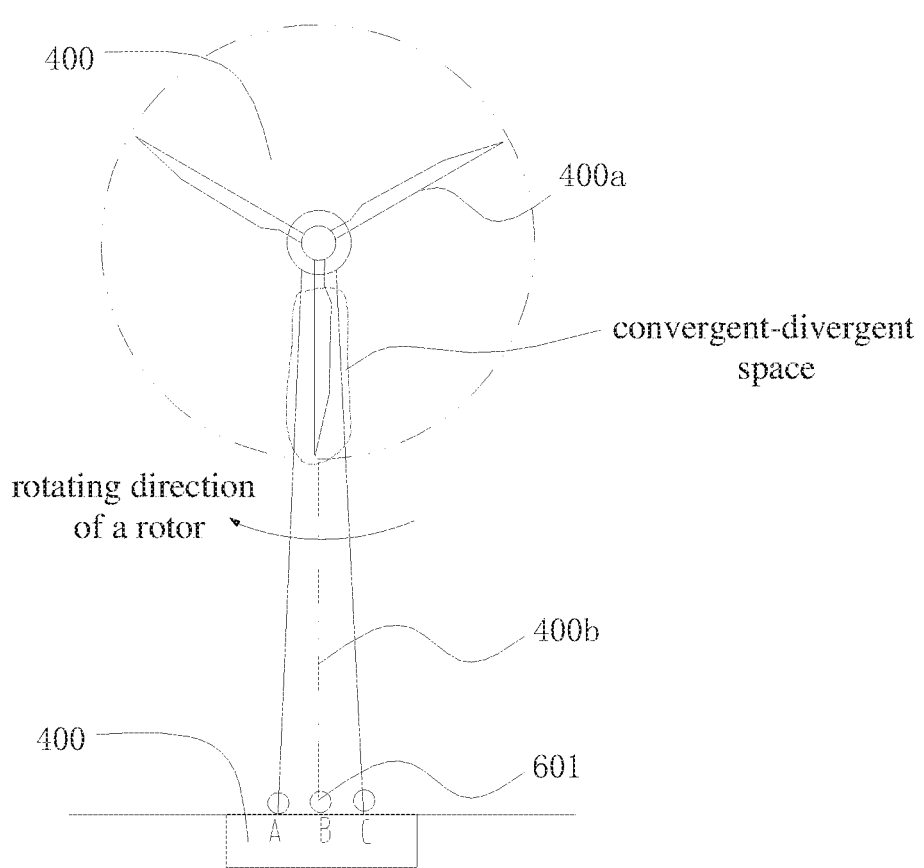
Figure 7:
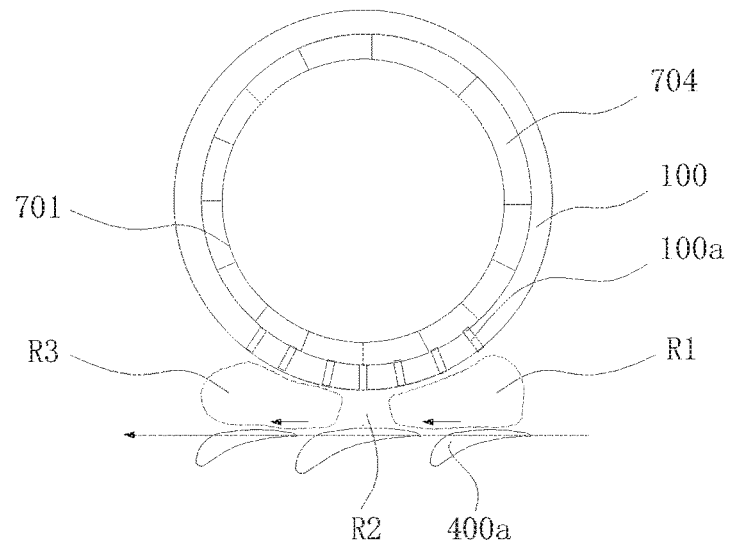
FIG. 7 is a diagram showing the principle of the occurrence of the tower shadow effect of the tower.

Referring to FIG. 6, FIG. 6 is a schematic view showing a tower shadow effect of a tower. FIG. 7 is a diagram showing the principle of the occurrence of a tower shadow effect of the tower. A dynamic variation of a blade 400a when rotating clockwise is shown at a lower side of the figure, in cases that the blade 400a is at three positions, a gradually convergent flow channel R1, a throat portion R2 and a gradually divergent flow channel R3 as shown in the figure are sequentially formed between the blade and the outer surface of the tower.

During the rotation of the blade 400a of the rotor 400, when the airflow passes by the tower 100, the "tower shadow effect" may occur. The inventors discover after surveying and measuring that the upwind incoming flow (multi-phase flow) is driven by the blade 400a in a rotating state. The gradually convergent flow channel R1 compressing the airflow is formed between the blade and the outer surface of the tower 100 before the blade 400a passes by a direct front side of the tower 100; a narrowest flow channel, i.e., the throat portion R2 shown in FIG. 7 is formed when the blade passes by the direct front side of the tower 100; and the gradually divergent flow channel R3 is formed after the blade 400a leaves the direct front side of the tower 100. In this way, actually, a section varying fluid transport channel in the fields of engineering thermodynamics and engineering fluid dynamics, i.e., a convergent-divergent flow channel (similar to a convergent-divergent jet pipe structure) like a convergent-divergent space shown in FIG. 6 is formed before and after the blade 400a passes by the tower 100.

Noise may be produced and thermodynamic irreversible energy loss may be incurred during the flowing process of the airflow in the convergent-divergent flow channel. Moreover, the process of compressing the upwind incoming flow may consume torque of the rotor 400, which may cause the noise destroying ecology (the energy of the noise also comes from the energy carried by the upwind incoming flow) while generating braking torque periodically. Moreover, based on the tower shadow effect, a bending moment in a downwind direction of the blade may be reduced in a pulsating manner when the corresponding blade 400a passes by the front side of the tower 100, and the bending moment is transmitted to a root of the blade via the blade 400a to cause fatigue failure to a pitch varying bearing due to a pulsating load. This is the reason of the issues in the background technology, which is discovered by the inventors after research, and these issues have been existed for a long time in the field of wind power.

In this solution, the tower 100 is provided with suction through holes 100a extending through the circumferential wall thereof. During suctioning the suction through holes 100a, when the blade 400a passes by, for the position of the tower 100 corresponding to the above convergent-divergent flow channel, the blocking effect of the tower 100 is weakened due to the suction effect. When the blade 400a passes by the tower 100, the situation behind the blade 400a is similar to an infinite space when the blade 400a rotates to an upper side, that is, the convergent-divergent flow channel cannot be formed between an outer wall of the tower 100 and the blade 100a actually, and after the suction, part of the airflow which is being compressed and has to flow around the tower 100 originally is suctioned to be in an expanded state to enter an inner wall of the tower 100, thereby suppressing and even eliminating all the hazards in the wind power industry caused by the tower shadow effect. In this case, this solution actually suppresses or eliminates the compression process (or compression work) when the airflow flows around the tower 100, and also increases the torque and power at wheel rim generated when the blade 400a passes by the front side of the tower 100, and improves a wind energy utilization coefficient in converting the wind energy into the rotational mechanical energy by the blade 400a; in addition, this solution also reduces the pulsation of the bending moment of the blade 400a in the downwind direction, and reduces the pulsating load to the pitch varying bearing which causes fatigue of the pitch varying bearing. Such kind of analyses of thermodynamic consumption and thermodynamic absorption and utilization in a dynamic process that the blade 400a passes by the front side of the tower 100 instantly (i.e., the irreversible consumption processes in which the compression, friction and energy are converted into noise) are a technical concept not disclosed currently in the field of the wind power generation.

The concept in this application goes beyond the pure field of aerodynamics, and the inventors comprehend that the issue to be addressed essentially pertains to a more general field of energy conversion and a more fundamental and profound theoretical category of reducing and controlling irreversible the energy loss from high energy to low energy occurred naturally in the conversion process in which low-quality energy (wind energy) is converted to high-quality energy (rotational mechanical energy). The inventors comprehend the thermodynamics effect in the process of tower shadow after long term measuring work in a wind farm in conjunction with the survey work on the terrain and landform of shafting damage of an electrical machine, and the above technical solutions are produced accordingly.

Moreover, in FIG. 6, angle measuring sensors are arranged at a bottom of the tower 100 or on the tower foundation 600, and three angle measuring sensors A, B and C are shown in the figure. A tip of the blade 400a can emit a laser 400b, and the angle measuring sensors A, B and C can sense the laser 400b, thereby knowing whether the blade 400a enters the convergent-divergent space. In this way, the moment that the upwind incoming flow on a windward side of the tower 100 enters a compression state can be acquired, and for eliminating the compression phenomenon, the suction through holes 100a at the windward side of the tower 100 are opened. That is, the angle measuring sensors facilitate the determination of timing of when the suction holes 100a are suctioned to eliminate the tower shadow effect, to effectively save energy.

With continued reference to FIGS. 4 and 7, to facilitate the implementation of suction to the suction through holes 100a, a shell 701 is further provided in the tower 100, and a closed suction cavity is enclosed by the shell 701 and an inner surface of a region, provided with the suction through holes 100a, of the tower 100. In FIG. 4, the suction through holes 100a are provided only in the upper part of the tower 100, correspondingly, the shell 701 cooperates with the inner surface of the upper part of the tower 100 to form a closed annular suction cavity. The suction apparatus suctions the suction cavity, to achieve suction to the suction through holes 100a from outside to inside.

It can be seen that with the arrangement of the closed suction cavity, all of the suction through holes 100a in the circumferential direction of the tower 100 can be suctioned as long as the suction apparatus suctions the annular suction cavity, thus the suction can be realized more easily. Of course, the suction cavity may not be provided. For example, the suction apparatus may have multiple suction openings 500a in cooperation with the suction through holes 100a, or one suction opening 500a corresponds to suction through holes 100a within a certain region.

An air filtration section 703 may be provided between the suction cavity and the suction opening 500a of the suction apparatus. Specifically, as shown in FIG. 5, an annular air filtration section 703 is provided at a bottom of the suction cavity, and the suction openings 500a of the suction apparatus are arranged at a lower side of the annular air filtration section 703, that is, the suction openings 500a are located at a bottom of the shell 701. The suction apparatus suctions the airflow from outside to inside, and the outside airflow may carry sand and dust, rainwater, etc. The air filtration section 703 may filter the suctioned airflow so as to avoid damaging the suction apparatus. When the suctioned airflow is discharged to the inside of the tower 100, the cleanliness of the discharged airflow may be improved as well to avoid polluting the air in the tower, which is disadvantage to operation of workers or may damage the elements inside the tower 100.

Figure 8:
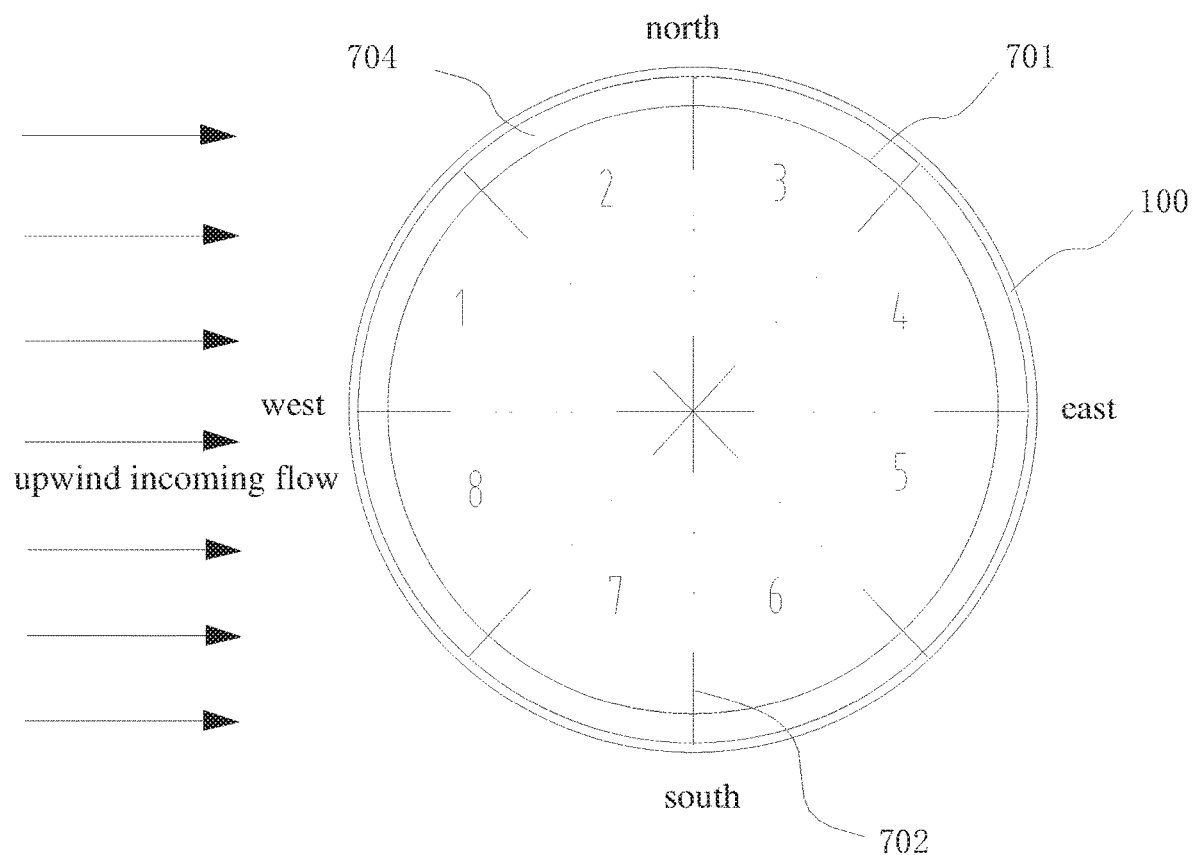
FIG. 8 is a top view of the top of the tower in FIG. 4, showing divided suction chambers.

Further, with continued reference to FIG. 5 and in conjunction with FIG. 8, FIG. 8 is a top view of the top of the tower 100 in FIG. 4, showing the divided suction chambers 704.

A plurality of partitions 702 are arranged in the suction cavity, and the partitions 702 divide the suction cavity into a plurality of suction chambers 704 distributed in the circumferential direction. It can be known from the above that, in order to reduce or directly eliminate adverse effects of the tower shadow effect, the position where the blade 400a passes by the tower 100 is mainly required to be suctioned, and the position where the blade 400a passes by the tower 100 is a position at the windward side of the tower 100, therefore, only the suction through holes 100a at the position corresponding to the windward side are required to be suctioned, and overall suctioning is not required, thus reducing energy consumption. Of course, the suction through holes 100a are still arranged in the circumferential direction, and regardless of a wind direction, the windward side has corresponding suction through holes 100a available to be suctioned.

In FIG. 8, the suction cavity is equally divided in the circumferential direction into eight suction chambers 704 by the partitions 702, and in the case that the upwind incoming flow comes from due west, the windward side corresponds to the suction chambers 704 with serial numbers 1 and 8. In this embodiment, it is preferable to suction the suction chambers 704 with the serial numbers 1 and 8, and the rest suction chambers 704 may not be suctioned. Multiple suction chambers 704 are arranged in FIG. 7, and the suction through holes 100a at the windward side (a lower side is due south, and a position where the blade 400a is located is just the windward side) are shown, and suction through holes 100a at other positions are not shown.

The windward side can be determined according to the wind direction. Specifically, a wind direction sensor can be provided, and the windward side and the serial number of the suction chamber 704 corresponding to the windward side are determined according to the detected wind direction.

Figure 9:
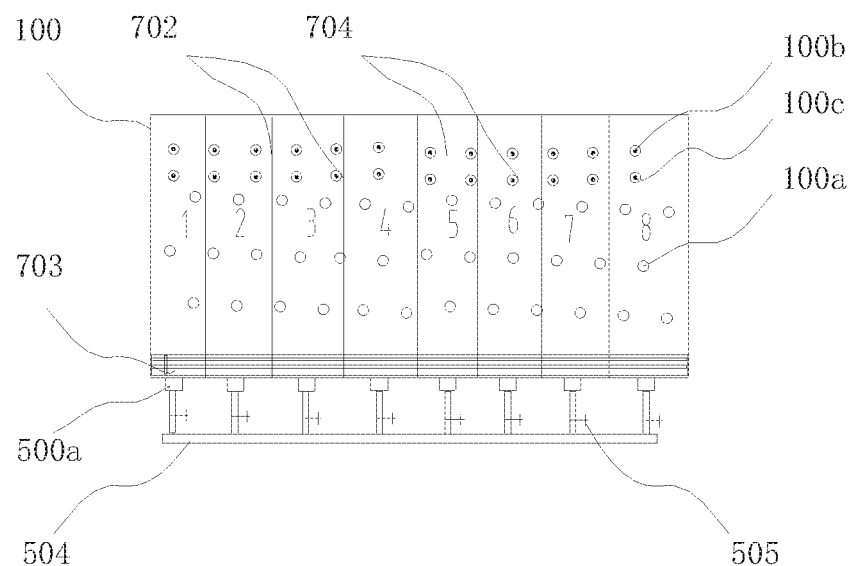
FIG. 9 is a schematic view showing that a pressure sensing element is arranged in a pressure sensing channel in FIG. 5.
Figure 10:
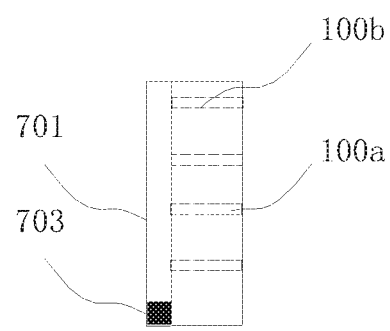
FIG. 10 is a side view of FIG. 9.
Figure 11:
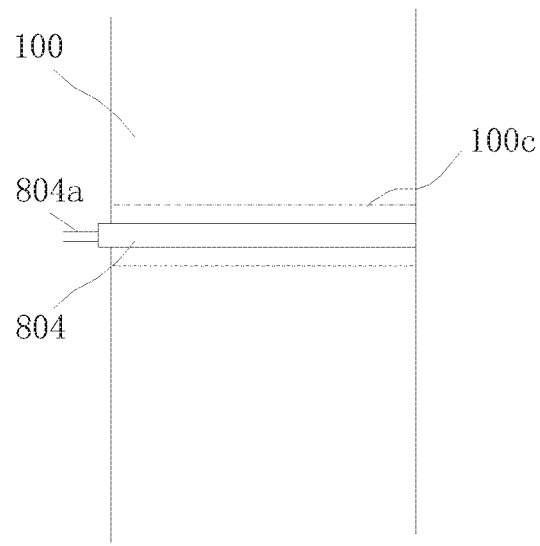
FIG. 11 is an enlarged view of a portion where the pressure sensing element is arranged in FIG. 10.

In addition, a pressure sensing element 804 may be further provided. As shown in FIGS. 9 to 11, FIG. 9 is a schematic view showing that a pressure sensing element 804 is arranged in a pressure sensing channel 100c in the circumferential wall of the tower 100; FIG. 10 is a side view of FIG. 9; and FIG. 11 is an enlarged view of a portion where the pressure sensing element 804 is arranged in FIG. 10.

The tower 100 may be further provided with multiple pressure sensing elements 804 distributed in its circumferential direction, which are configured to detect the pressure at the outer surface of the tower 100. The tower shadow effect may cause pressure fluctuation, according to the situation of the pressure detected by the pressure sensing elements 804, the position of pressure fluctuation may be obtained, and the position is just the position of the windward side of the tower 100. The pressure sensing elements 804 can output detected pressure signals to a controller, and the controller judges to determine the position of the windward side, and then the suction apparatus is controlled to suction the suction chambers 704 corresponding to the windward side.

As shown in FIG. 10, a pressure sensing channel 100c may be provided in the circumferential wall of the tower 100, and the pressure sensing channel 100c also extends through the circumferential wall of the tower 100. An outer end (a right end in FIG. 10), close to the outer surface of the tower 100, of the pressure sensing element 804 is configured to sense the pressure of the airflow at the outer surface of the tower 100, and an inner end (a left end in FIG. 10), close to the inner surface of the tower 100, of the pressure sensing element 804 is a lead end 804a which can output a signal to the controller. Of course, the pressure sensing element 804 may also output the signal wirelessly.

Such an arrangement not only facilitates the pressure sensing element 804 detecting the pressure of the airflow at the outer surface of the tower 100, but also facilitates the transmission of signals. The pressure sensing channel 100c can also function to protect the pressure sensing element 804 to a certain extent.

The pressure sensing element 804 and the wind direction sensor can verify each other and be redundancy for each other. When the positions determined by the pressure sensing element and the wind direction sensor are different, it is obviously that failure of sensor occurs, and the windward side can be determined according to the sensor which is finally determined not failed.

The suction through holes 100a provided above may be suctioned for suppressing vortex-induced vibrations in addition to weakening or eliminating the adverse effects of the tower shadow effect.

It can be known from the description of the background technology that when the upwind incoming flow flows around the tower 100, a boundary layer will form periodic vortex shedding at two sides at the back of the tower 100, that is, the bypassing flow detachment phenomenon, which is also the cause of vortex-induced vibrations. In this solution, suctioning from the plurality of suction through holes 100a may be performed to allow the boundary layer to be "adsorbed" on the outer surface of the tower 100, thereby suppressing or directly preventing the boundary layer from being detached from the outer surface of the tower 100, which reduces or eliminates the cause of vortex-induced vibrations, so as to achieve the object of suppressing vortex-induced vibrations. Obviously, the suction through holes 100a are distributed in the circumferential direction, thus regardless of the wind direction of the upwind incoming flow, there are always corresponding suction through holes 100a available to be suctioned at the corresponding position of the bypassing flow detachment.

In principle, during the occurrence of vortex-induced resonance of the tower 100 structure, a vortex-induced force (i.e., an unbalanced force) acting on the outer surface of the tower 100 structure is approximately a simple harmonic force F(t):

$$F(t) = F_0 \sin \omega t \tag{1}$$

where, $\omega$(Re, St) is vortex shedding frequency, and $\omega t$ as a whole is a variable;

$$Re = \frac{\rho u d}{\mu},$$

Re is Reynolds number and is a dimensionless number;

$F_0$ is an amplitude value of the vertex-induced force, $F_0 = (\rho U^2/2) CD$;

$\rho$ is the density of the upwind incoming flow for the tower 100;

U is a wind speed of the upwind incoming flow for the tower 100;

C is an aerodynamic coefficient of a section of the tower 100 structure; the aerodynamic coefficient is also called a wind load shape coefficient, which is a ratio of a pressure (or suction) formed by the wind on a surface of an engineering structure to a theoretical wind pressure calculated according to the wind speed of the incoming flow. The aerodynamic coefficient reflects the distribution of a stable wind pressure on the surface of an engineering structure and a surface of a building, and varies with the airflow direction, and the shape, scale, shielding conditions of the building and the like;

D and d are feature dimensions of a space structure formed by an obstacle facing a fluid when the fluid bypasses the obstacle and flows around the obstacle, and are generic terms in the field of heat transfer. In this embodiment, D and d refer to the feature dimensions of a contact surface between an enclosure (a shape of the outer surface of the tower herein) and the fluid (the airflow herein), generally a structural width perpendicular to the wind direction is employed, i.e., an outer diameter of the tower 100 at a corresponding height. That is, the outer diameter of the tower 100 at a height of a segment where the suction through holes 100a are distributed; and $\mu$ is a viscosity coefficient of the upwind incoming flow.

The variation of amplitude of the transverse vibration of the tower 100 structure caused by the vortex-induced force is:

$$A(t) = \frac{\pi}{\delta} \frac{1}{K} (\rho U^2/2) CD \sin \omega t \tag{2}$$

where, K is the stiffness of a tower 100 structure system (which may include a nacelle 200); and δ is a logarithmic decrement (about 0.05).

When the wind speed of the upwind incoming flow reaches a certain suitable value and continues to act for a certain period of time, vortex-induced resonance may occur in the tower 100 structure, and the vibration amplitude A herein is:

$$A = \frac{\pi}{\delta} \frac{\rho C f^2}{2K(St)} D^3 \quad (3)$$

It can be seen that when the size of the section of the structure is fixed, the amplitude of the vortex-induced resonance can be reduced by means of increasing the damping, for example, reducing the aerodynamic coefficient C, or reducing the density ρ of the upwind incoming flow.

The above formula $$St = \frac{fD}{U},$$

i.e., Strouhal number. The definition of Strouhal number describes the relationship between the vortex shedding frequency, the wind speed, and a diameter of a cylinder.

Where, f is the vortex shedding frequency, Hz;

U is the wind speed of the upwind incoming flow of the tower 100;

D is an outer diameter of a portion at an average height of the segment, where the suction through holes 100a are distributed, of the tower 100.

In this embodiment, D refers to the outer diameter of the tower 100 at different heights. The outer diameter may change. When the upwind incoming flow is non-horizontal, and flows around the tower 100 at a certain inclination angle, a path of the flow bypassing a periphery of the tower 100 is approximately oval-shaped, as the aerodynamic configuration described hereinbefore. In this case, the feature dimension D is an equivalent diameter (a technical term in heat transfer, which is a diameter of an imaginary circular section, i.e., a diameter of a circular section converted by a non-circular section according to an equal circumference) of the oval-shaped aerodynamic configuration. In this case, a boundary that is wetted by the fluid or in contact with the fluid becomes more streamlined, and is less blunt. Viewed from the vibration form, vortex-induced resonance is an amplitude-restricted vibration having dual characteristics of being self-excited and forced.

Figure 12:
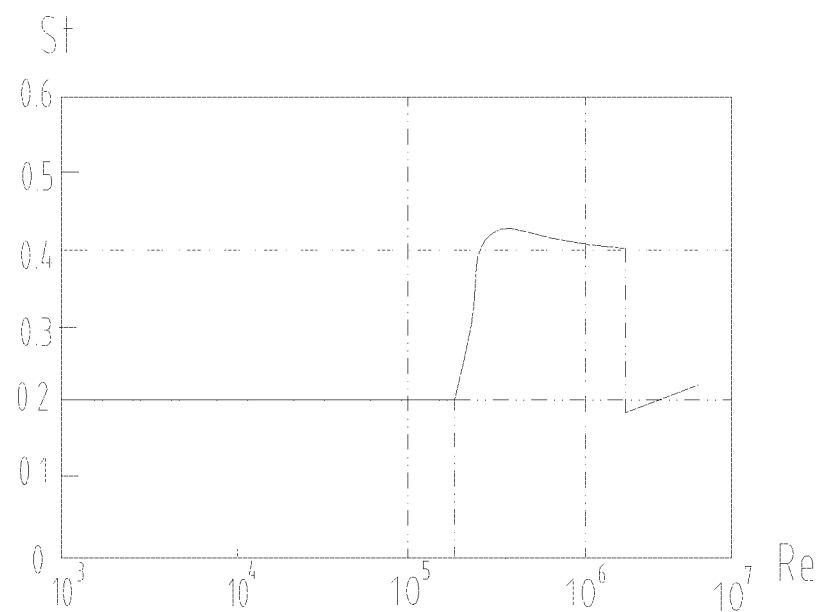
FIG. 12 is a schematic view showing the relationship between Strouhal number and Reynolds number on an outer surface of the tower.

The Strouhal number can be obtained based on the Reynolds number. Reference may be made to FIG. 12 for the relationship of the Strouhal number with the Reynolds number. FIG. 12 is a schematic view showing the relationship between the Strouhal number and the Reynolds number of the outer surface of the tower, wherein the horizontal axis represents the Reynolds number, and the vertical axis represents the Strouhal number. Before the Reynolds number reaches $2 \times 10^5$, the Strouhal number is a constant 0.20; after that, as the Reynolds number increases, the Strouhal number first jumps to 0.30, then increases to 0.43, and then when the Reynolds number equals $2 \times 10^6$, the Strouhal number drops back to 0.2. Therefore, the Strouhal number, D and U are parameters that can be obtained, and f can also be calculated based on the formula of the Strouhal number, and accordingly, the vibration amplitude A can also be calculated.

When the upwind incoming flow flows around the tower 100, based on the suction effect, the boundary layer airflow on the outer surface of the tower 100 may be suctioned towards the inside of the tower 100 at the position, where the suction through holes 100a are provided, of the tower 100, to keep the boundary layer in a laminar flow state, to avoid transition of the boundary layer, so as to reduce a surface friction force, and to allow the airflow to adhere to the outer surface of the tower 100 while flowing. The suction through holes 100a and the outer surface of the tower 100 are in smooth transition, leading to the reduction of the aerodynamic coefficient (C) of the airflow flowing around the tower 100. According to the formula (3), the amplitude (A) of the vortex-induced resonance can be reduced and the vortex-induced vibration can be suppressed.

Similarly, in the case of suctioning, the shell 701 may also be provided, so that an annular suction cavity is formed between the shell and the inner surface of the tower 100, which facilitates the suction.

It should be known that the bypassing flow detachment is an important cause of the formation of the Karman vortex street leading to the vortex-induced vibration, therefore, by only suctioning the suction chambers 704 at the position of the bypassing flow detachment, the detachment of the boundary layer here may be weakened or prevented, to suppress the occurrence of Karman vortex street, thereby suppressing or directly preventing the vortex-induced vibration. Compared with the method of suctioning the entire annular suction cavity, it is obvious that the method of performing suction only to the position of the bypassing flow detachment is more targeted and can save energy, that is, to perform directional suction to the upwind incoming flow (multi-phase flow).

While the windward side is suctioned similarly to weaken or eliminate the tower shadow effect, obviously, both the windward side and the positions of the bypassing flow detachment at two sides of the windward side are required to be suctioned.

FIG. 8 is still taken as an example, the phenomenon of bypassing flow detachment may occur when the upwind incoming flow flows around the tower 100. In FIG. 8, the upwind incoming flow comes from due west, thus the bypassing flow detachment phenomenon occurs at the back of the tower 100 at positions approximately north by east and south by east (the positions turned clockwise or counterclockwise by 110 to 130 degrees from the position, directly facing the upwind incoming flow, of the tower 100), which correspond to the suction chambers 704 as indicated by serial numbers 3 and 6 in FIG. 8. In this embodiment, it is preferable that the suction apparatus suctions the suction chambers 704 corresponding to the positions of the bypassing flow detachment, which substantially are the two suction chambers 704 indicated by the serial numbers 3 and 6 in FIG. 8. Therefore, the preferable solution is to suction the four suction chambers 704 with serial numbers 1, 8, 3 and 6. In this way, not only the adverse influence of the tower shadow effect is weakened or eliminated, but also the vertex-induced vibrations can be suppressed or eliminated.

As shown in FIG. 5, the suction apparatus may have several suction openings 500a in one-to-one correspondence with the plurality of suction chambers 704, and a switch valve is provided between each of the suction openings 500a and the corresponding suction chamber 704. When the suction chambers 704 corresponding to the windward side and/or the positions of the bypassing flow detachment are suctioned, the switch valves corresponding to the rest suction chambers 704 are switched off. The switch valves may specifically be electric control valves 505, and in this case, a controller may be further provided. The controller may obtain the positions of the bypassing flow detachment and the position of the windward side, thereby controlling the electric control valves 505 corresponding to the positions of the bypassing flow detachment and the windward side to be turned on, and controlling the rest electric control valves 505 to be turned off, to achieve automatic control. Of course, as a redundant or alternative solution to the electrical control, manual control is also feasible.

Each suction chamber 704 corresponds to one suction opening 500a in one-to-one correspondence, thus, the suction force of the suction apparatus can be better assured, and only one suction apparatus is required to cooperate with the corresponding switch valves. It should be known that it is also feasible to equip each suction chamber 704 with one suction apparatus, however, it is obvious that the arrangement of one suction apparatus corresponding to all of the switch valves has a cost advantage.

In the case that the suction apparatus is provided with the suction openings 500a corresponding to the plurality of suction chambers 704, a suction conflux main pipe 504 may be further provided. In FIG. 4, the part, specifically performing the suction function, of the suction apparatus is an air suction machine 501. The airflow in the suction chambers 704 flows through the suction openings 500a, and then converges to the air suction machine 501 through the suction conflux main pipe 504, which facilitates the connection of the multiple suction openings 500a to the air suction machine 501, and may also simplify the suction pipeline of the suction apparatus.

Figure 13:
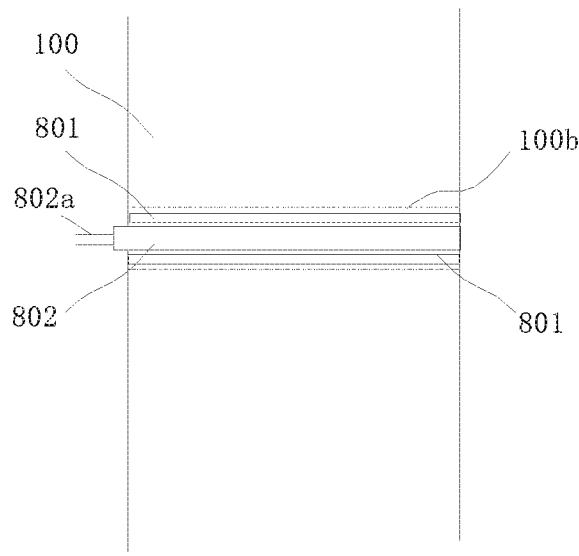
FIG. 13 is a schematic view showing that a temperature sensing element is arranged in a temperature sensing channel in FIG. 9.

With continued reference to FIG. 9 in conjunction with FIG. 13, FIG. 13 is a schematic view showing that a temperature sensing element is provided in a temperature sensing channel in FIG. 9.

Similar to the arrangement of the pressure sensing element 804, the tower 100 may be further provided with a plurality of temperature sensing elements 802 distributed in the circumferential direction thereof, as shown in FIG. 13. The temperature sensing elements 802 are configured to detect the temperature of the boundary layer airflow at the outer surface of the tower 100, so as to obtain the position of the bypassing flow detachment. According to the phenomenon of the bypassing flow detachment described above, at the position of the bypassing flow detachment, counter flowing occurs in the boundary layer and vortexes are formed, so that the normal flowing in the boundary layer is disrupted, and a heat transfer coefficient at this position is the highest, therefore, the temperature there is also relatively low. By detecting the temperature of the entire circumference of the tower 100, the position where the temperature is relatively low is just the position of the bypassing flow detachment. Of course, due to the irradiation of sunlight, the temperature at the position of the bypassing flow detachment on a shady side of the tower 100 is slightly lower, and the other position of the bypassing flow detachment may be determined according to the position of the bypassing flow detachment with the slightly lower temperature and the position of the upwind incoming flow. Specifically, the upwind incoming flow and the windward side of the tower 100 form a stagnation point (an airflow stagnation point, which is a line from top to bottom on the windward side of the tower 100), the stagnation point and the positions of the bypassing flow detachment at the two sides of a leeward side of the tower 100 constitute an isosceles triangle in the horizontal plane. Therefore, the other position of the bypassing flow detachment can be obtained with the assistance of the isosceles triangle relationship.

As shown in FIG. 8, when sunlight irradiates from due south, the temperature at the suction chamber 704 corresponding to the serial number 3 is slightly lower, and the temperature of the suction chamber 704 corresponding to the serial number 8 is actually slightly higher. The position of the bypassing flow detachment at one side may be determined according to the suction chamber 704 corresponding to the serial number 3, and the position of the bypassing flow detachment at the other side may be determined according to the position directly facing towards the upwind incoming flow, that is, the position of the bypassing flow detachment obtained by rotating counterclockwise by the same angle as the angle between the position of the bypassing flow detachment at the one side and the position directly facing the upwind incoming flow from the position directly facing the upwind incoming flow is at the position of the suction chamber 704 corresponding to the serial number 6.

The temperature sensing element 802 may output a detected temperature signal to the controller, the controller judges and then determines the position of the bypassing flow detachment, and then controls the suction apparatus to suction the corresponding suction chamber 704.

As shown in FIG. 13, a temperature sensing channel 100b may be provided in the circumferential wall of the tower 100, the temperature sensing channel 100b also extends through the circumferential wall of the tower 100. An outer end, close to the outer surface of the tower 100, of the temperature sensing element 802 (a right end in FIG. 13) is configured to sense the temperature of the boundary layer at the outer surface of the tower 100, and an inner end (a left end in FIG. 13), close to the inner surface of the tower 100, of the temperature sensing element 802 is a lead end 802a which can output a signal to the controller. Of course, the temperature sensing element 802 may also output the signal wirelessly.

Such an arrangement not only facilitates the temperature sensing element 802 detecting the temperature of the boundary layer airflow at the outer surface of the tower 100, but also facilitates the transmission of signals. The temperature sensing channel 100b can also function to protect the temperature sensing element 802 to a certain extent. It can be understood that, based on the heat transfer, for a position, having a high heat exchange coefficient and a low temperature, of the outer surface, its corresponding position on the inner surface also has a slightly low temperature, therefore, the temperature sensing element 802 may also be arranged at the inner side of the tower 100 for detecting the temperature of the inner surface of the tower 100. Of course, comparatively speaking, it is more accurate to determine the position of the bypassing flow detachment according to the temperature, detected by the temperature sensing element 802, of the boundary layer at the outer surface.

In view of the solution in FIG. 13, in which the temperature sensing element 802 is arranged inside the temperature sensing channel 100b in the circumferential wall of the tower 100, a thermal insulation layer 801 may be provided between the temperature sensing element 802 and an inner wall of the temperature sensing channel 100b, to prevent the detected temperature from being interfered by the temperature of the circumferential wall of the tower 100, so that only the temperature at the position on the outer surface of the tower 100 is measured. In addition, a predetermined distance may be provided between an outer end opening of the temperature sensing channel 100b and the temperature sensing element 802, and the predetermined distance may be 15 mm to 25 mm, that is, the temperature sensing element may be retracted to the inside of the temperature sensing channel 100b by a certain distance, to allow it to accurately sense the temperature of the boundary layer at the outer surface without being affected by the radiation of sunlight.

In addition, an inner diameter of the temperature sensing channel 100b can be selected to range from 9 mm to 11 mm, which is advantageous to prevent the entrance of solar radiation and to avoid interference to the measurement of the temperature sensing element 502. In addition, to prevent rainwater, sand, dust and the like from entering the inside of the tower 100 through the temperature sensing channel 100b, an umbrella-like or mushroom head-like shield may be further provided at the outer end opening of the temperature sensing channel 100b.

A method for obtaining the position of the bypassing flow detachment according to the temperature detection is provided above. In addition to this, the position of the bypassing flow detachment may also be obtained through the following methods.

Figure 14:
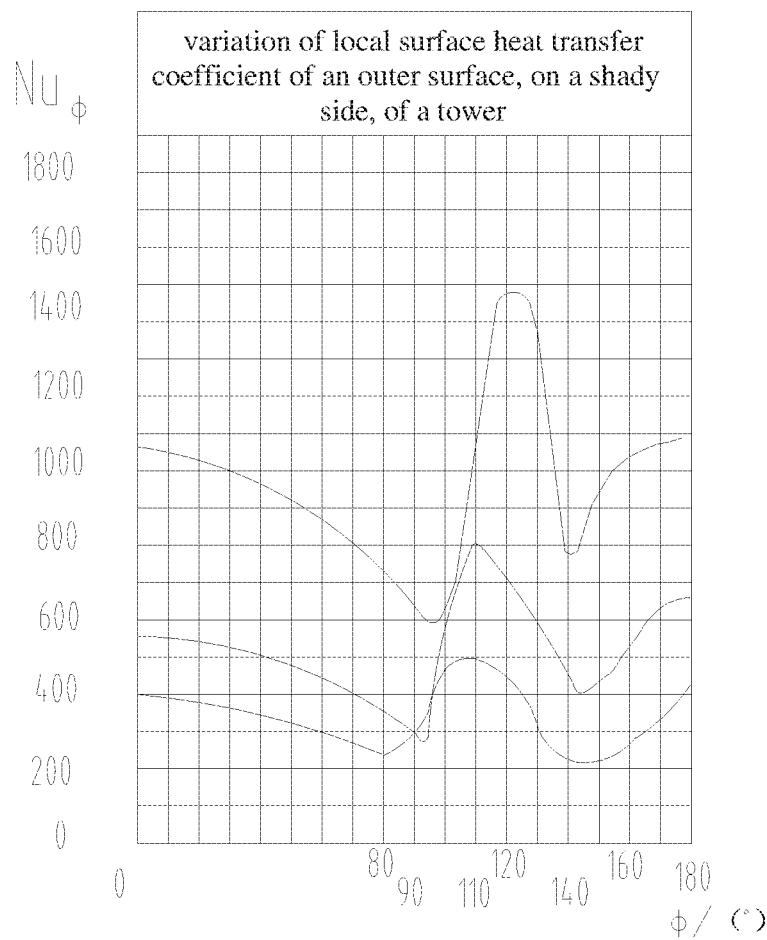
FIG. 14 is a graph showing Nusselt number Nu on a local surface of the tower varies with the variation of an angle at three Reynolds numbers Re when the airflow sweeps over the tower.

A wind speed sensor and a wind direction sensor may be provided, to detect the wind speed and wind direction so as to obtain the position of the bypassing flow detachment. Referring to FIG. 14, FIG. 14 is a graph showing Nusselt number Nu on a local surface of the tower varies with the variation of an angle of the airflow at three Reynolds numbers Re when the airflow sweeps over the tower.

A wind speed sensor, a wind direction sensor and a temperature sensor may be provided (according to physical quantities involved in Reynolds number), to measure the airflow temperature, correct the viscosity coefficient of the airflow and correct the density of the airflow, so as to obtain Reynolds number to obtain the position of the bypassing flow detachment through the Reynolds number. The vertical coordinate axis is Nusselt number Nu, a dimensionless number, which indirectly reflects the magnitude of the surface heat transfer coefficient, and the horizontal coordinate axis represents an angle turned clockwise rightwards from the normal vector of a contact surface of the upwind incoming flow in contact with a wall surface of the tower, and the angle is defined as φ (degree). From bottom to top, Reynolds numbers of the three consecutive curves in the figure gradually increase, and three peak values are about 110 degrees to 125 degrees, and also gradually increase correspondingly. Here, the angles corresponding to the three "peak values" are just at the position corresponding to back flow against a pressure gradient of the bypassing flow detachment, and at this position, the heat exchange rate of the airflow with the outer wall of the tower is the highest.

Figure 15:
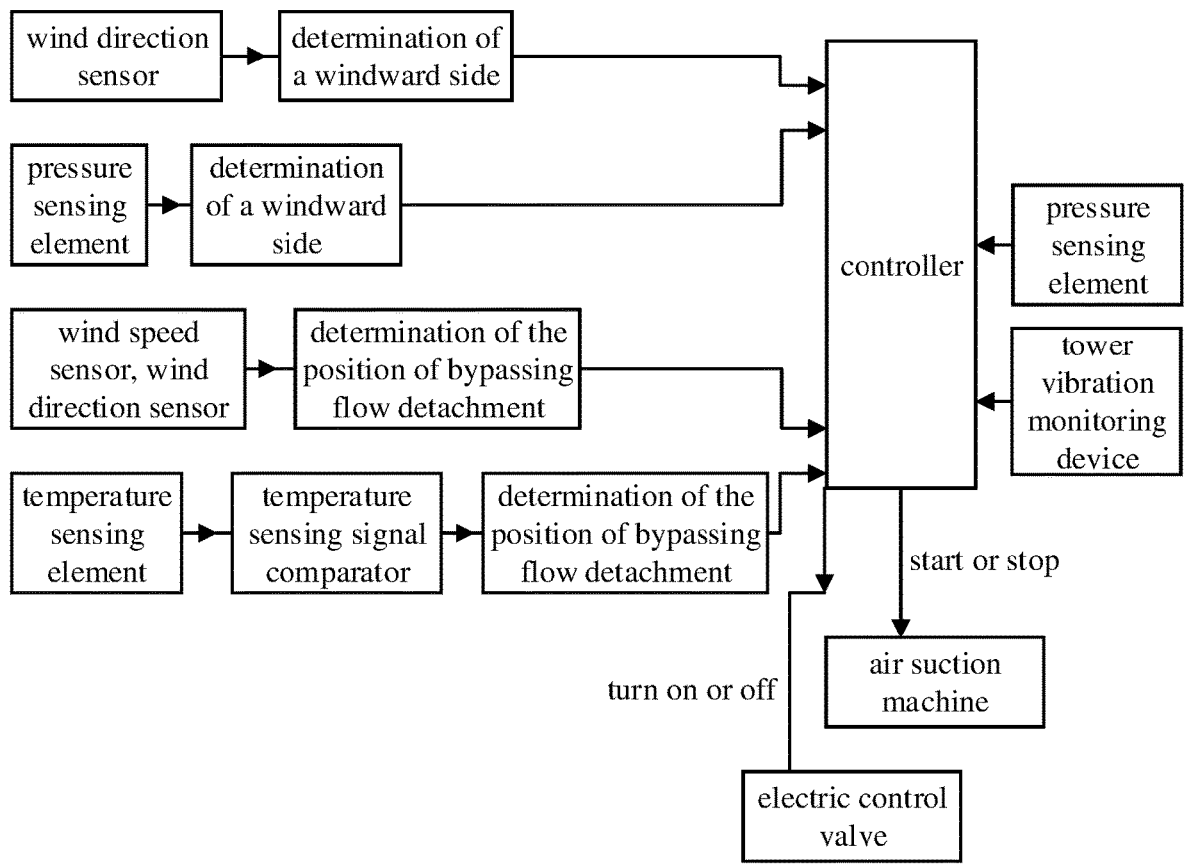
FIG. 15 is a control block diagram showing the suction to a suction cavity in FIG. 4.
Figure 16:
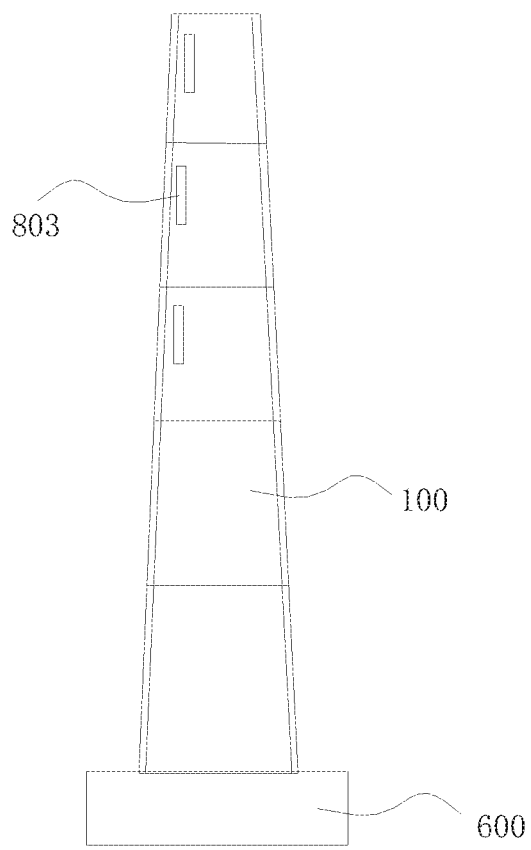
FIG. 16 is a schematic view showing that a vibration monitoring device is provided inside the tower.

Reference is made to FIGS. 15 and 16, FIG. 15 is a control block diagram showing the suction to the suction cavity in FIG. 4, and FIG. 16 is a schematic view showing that a vibration monitoring device 803 is arranged inside the tower 100.

The methods for determining the position of the bypassing flow detachment described above can be performed at the same time, so as to verify each other and be redundancy for each other. Under normal circumstances, the positions of the bypassing flow detachment obtained by the two methods should be the same or substantially the same. If the deviation between the two positions is too large, there may be a failure in the temperature sensing element 802, or a failure in the wind direction sensor or the wind speed sensor. After the failed sensor is further determined, the actual position of the bypassing flow detachment is determined according to the data detected by the sensor not failed.

As shown in FIG. 15, the two methods for determining the position of the bypassing flow detachment are performed at the same time, and the detected data and the determined results are fed back to the controller at the same time. In FIG. 15, the temperature signal of the temperature sensing element 802 is compared by a temperature sensing signal comparator to obtain a range of the position of the bypassing flow detachment. Obviously, it is also feasible that the controller determines after receiving the data, or the temperature sensing signal comparator may be a unit module of the controller.

In addition, similar to the determination of the position of the bypassing flow detachment, the two kinds of determination methods for determining the position of the windward side may also be performed at the same time, the controller determines the actual position of the windward side according to the wind direction detected by the wind direction sensor and the fluctuation situation of the pressure detected by the pressure sensing element 804.

According to the determined actual positions of the bypassing flow detachment and the windward side, the controller outputs a control signal, to control the air suction machine 501 in the suction apparatus to be started, and control the electric control valves 505 of the suction chambers 704 corresponding to the positions of the bypassing flow detachment and the windward side to be turned on to perform suction, and at the same time, control the electric control valves 505 of the rest suction chambers 704 to be turned off, that is, the electric control valves 505 corresponding to the suction chambers 704 with the serial numbers 1, 3, 6 and 8 are turned on and the electric control valves 505 corresponding to the suction chambers 704 with the serial numbers 2, 4, 5 and 7 are turned off in FIG. 8.

As shown in FIG. 16, a vibration monitoring device 803 may be arranged inside the tower 100 to detect the vibration situation of the tower 100 and output data signals of vibration (amplitude, frequency of vibration, etc.) to the controller. The vibration monitoring device 803 may be arranged on the inner surface of the tower 100, or may be arranged, for example, inside the circumferential wall of the tower 100 or at other positions, and the arrangement of arranging the vibration monitoring device 803 on the inner surface of the tower 100 is simple and easy to implement. The controller adjusts the air suction machine 501 according to the feedback of the vibration monitoring device 803. In addition to performing the adjustments of starting and stopping the air suction machine shown in FIG. 15, the controller may further control the frequency and voltage of a motor which drives the air suction machine 501, to implement variable voltage and variable frequency speed regulation to the motor, to achieve regulation to an air suction flow rate of the air suction machine 501.

Adjusting the power of the air suction machine 501 may increase the air suction flow rate when the vibration is strong, for example, and may reduce the air suction flow rate when the vibration is reduced. In addition, the distribution density of the suction through holes 100a and a bore diameter of the suction through holes 100a itself may affect the effect of air suction (a periphery of an outer surface of the suction through hole 100a and the inside of the hole may be in smooth transition). The power of the air suction machine 501 is adjustable, such that the arrangement of the suction through holes 100a may have a better flexibility. The suction through holes 100a may be arranged sequentially or in a staggered manner in the circumferential direction of the tower 100.

In the environment of high altitude, at the top or hillside of a high mountain, during installing the wind turbine generator system and performing the task of hoisting the tower 100, the vibration state information obtained by the arranged vibration monitoring device 803 may be transmitted to the ground wirelessly, so that the on-site command staff can master the information and carry out safe tower hoisting operations.

The pressure sensing element 804 senses the pressure fluctuation situation for determining the windward side, in addition to that, the pressure signal detected by the pressure sensing element 804 may also assist in determining the variation situation of the tower shadow effect after the suction is performed. When the pressure fluctuation is reduced or eliminated, it is obviously that the suction effect is achieved. If the pressure fluctuation is still large, the air suction flow rate may be adjusted accordingly, till the pressure fluctuation is reduced obviously or eliminated. In addition, in view of the elimination of the tower shadow effect, the rotating speed of the rotor 400 and the current wind speed (which can be detected by the wind speed sensor) are related to an opening frequency (the opening frequency is determined by the variation of the direction of the upwind airflow) and an opening degree (the opening degree is determined by the variation of the magnitude of the wind speed of the upwind airflow, the greater the wind speed, the greater the opening degree) of the electric control valve 505, which can be controlled by the controller accordingly.

When the suction chambers 704 at the windward side and the positions of the bypassing flow detachment are opened at the same time, the controller can comprehensively adjust the air suction machine 501 and the opening degree of the electric control valves 505 according to the signals from the pressure sensing elements 804 and the vibration monitoring device 803.

It should be noted that, in the above embodiments, the suction through holes 100a are provided only in the upper part of the tower 100. With such an arrangement, the further technical effects described in the following can be achieved.

Due to the presence of the suction through holes 100a which can be suctioned, the upwind incoming flow is divided into different segments when flowing around the tower 100. One type of the segments is corresponding to the suction through holes 100a, at which, Reynolds number is significantly increased artificially. The upwind incoming flow has an increased bypass flowing speed in this type of segment, and closely adheres to the outer surface of the tower 100, without causing phenomena of boundary layer detachment and vortex street, which obstructs the formation of vortexes at the two sides at the back of the upper part of the tower 100. Another type of the segments is not corresponding to the suction through holes 100a of the tower 100, in this type of segment, without the assistance of suction, Reynolds number is not changed, and the bypass flowing speed is low.

Therefore, in essence, the method of providing the suction through holes 100a in the local height segment thoroughly disturbs the situation in the conventional technology that the frequencies of vortex shedding at the upper part and the lower part of the tower 100 are consistent, thereby weakening their co-action, reducing or preventing the vortex-induced resonance response when the bypassing flow detachment occurs in the boundary layer at the outer surface of the tower 100, thus suppressing or directly preventing the vortex-induced vibrations at the upper part of the tower 100.

Correlation is an important feature of fluctuating wind, here it is related to fluctuating wind speeds at two points in the space or the fluctuating pressures of two points at different heights on the surface of the tower 100.

A correlation coefficient ρ is defined as $$\rho = \frac{\overline{u'(Z_1)u'(Z_2)}}{\sigma_u(Z_1)\sigma_u(Z_2)},$$

at two different heights ($Z_1$, $Z_2$), the covariance of the fluctuating wind speeds is defined as follows:

$$\overline{u'(Z_1)u'(Z_2)} = \frac{1}{T}\int_0^T [U(Z_1,t) - \overline{U}(Z_1)][U(Z_2,t) - \overline{U}(Z_2)]dt,$$

therefore, the covariance is the time average of the product of the fluctuating wind speeds at the two heights. The wind speed values on the right side of the equation have their respective average values $\overline{U}(Z_1)$ and $\overline{U}(Z_2)$ subtracted respectively.

In mathematics, the formula of standard deviation can be written as:

$$\sigma_u = \left\{\frac{1}{T}\int_0^T [U(t) - \overline{U}(Z)]dt\right\}^{\frac{1}{2}},$$

where, U(t) represents a wind speed component in a direction of an average wind speed, and is equal to $\overline{U}(Z)+u(t)$; and u(t) is a turbulence component in the downwind direction, that is, the fluctuating wind speed component in the direction of the average wind speed.

The numerator represents the covariance of fluctuating wind speeds, and the fluctuating wind speeds at two different heights of the tower 100 are different.

The covariance is the time average of the product of the fluctuating wind speeds at the two heights.

The overall intensity of turbulence can be measured by the standard deviation of wind speed or root mean square, an average component is subtracted from the wind speed, and then the deviation is used to quantify a remaining part, the deviation is squared and then averaged, and the averaged value is finally extracted, to obtain a physical quantity having a unit of the wind speed, thus the standard deviation is obtained. According to the definition formula of the correlation coefficient, the correlation coefficient between two wind speeds at different heights is obtained by the covariance of wind speeds at different heights being divided by the standard deviation. A smaller correlation is better, with a small correlation, the frequencies of vortexes shedding at different heights after the vortexes are formed can be hindered to be consistent, and the accumulation and increase of the vortex-induced resonance energy caused by the consistency of the vortex shedding frequencies is disrupted, i.e., preventing the increase of the vortex-induced resonances, and even causing the vortex-induced resonances to disappear.

The mean square value of the total fluctuating wind force on the surface of the tower 100 structure is $\overline{F'^2}=f[\rho(y_i-y_j)]$, where $y_i$, $y_j$ are two points in the vertical direction, and $\rho(y_i-y_j)$ is the correlation coefficient of fluctuating wind forces of each segment.

It should be known from the above description, in the height direction, the circumferential wall of the tower 100 is provided with the segment having the suction through holes 100a and the segment without suction through holes 100a, thereby disrupting the correlation between the upper part and the lower part, weakening or eliminating vortex-induced vibrations. However, the vortex-induced forces in fluid-structure coupling are not uniformly distributed on the outer surface of the tower 100 in a height direction, and the energy of the vortex-induced force is more concentrated on the upper part of the tower 100, so the suction through holes 100a may only be arranged in the upper part of the tower 100, which can not only reduce the damage caused by vibrations in a more targeted manner, but also break the correlation between the upper part and the lower part. Of course, it is feasible to provide the suction through holes 100a at a position other than the upper part in the height direction or provide the suction through holes 100a in multiple segments at different heights.

Figure 17:
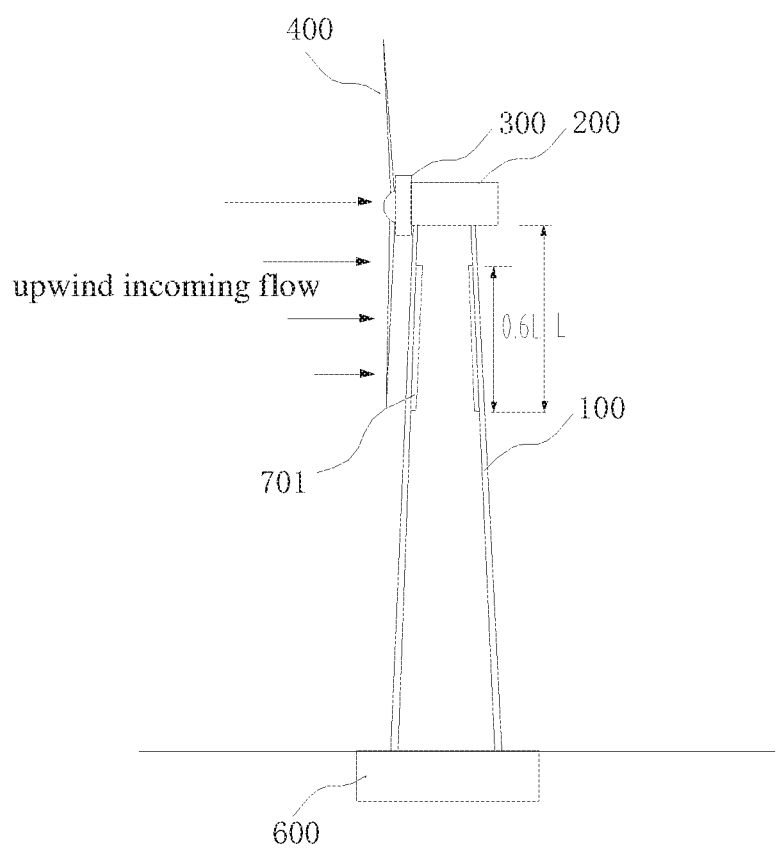
FIG. 17 is a schematic view showing the comparison between a region provided with suction through holes in FIG. 4 and a length of a blade.

As shown in FIG. 17, FIG. 17 a schematic view showing the comparison between a region provided with suction through holes 100a in FIG. 4 and a length of the blade 400a.

In the case that the suction through holes 100a are only arranged in the upper part of the tower, when addressing the tower shadow effect, it is preferable that the region provided with the suction through holes 100a covers the region of the length of the blade 400a. In FIG. 17, a bottom of the region provided with the suction through holes 100a is flush with or slightly lower than a lowermost point of the blade 400a, and limited by the top of the tower 100, a top of the region provided with the suction through holes 100a does not reach a top rim of the tower. In the figure, the length of the blade 400a is specifically L, and a height of the region of the suction through holes 100a is about 0.6 L.

The embodiments described above can be further optimized.

As shown in FIG. 4, air discharge openings 500b of the suction apparatus may be located at the bottom in the tower 100, which can be understood with reference to FIG. 18. FIG. 18 is a schematic view showing an airflow path of the discharged airflow in FIG. 4 after the airflow rises to the top of the tower 100.

In the case that the air discharge openings 500b are located at the bottom in the tower 100, the airflow discharged from the air discharge openings 500b may be continuously collected at the bottom of the tower 100 in a large quantity, thereby generating a positive pressure, and forming positive pressure airflow, to push the air (hot airflow generated by electric equipment such as a high power converter or transformer) at the bottom of the tower 100 and in the tower 100 upward. The pushing effect allows the hot airflow inside the tower 100 (a high power transformer, and various electric equipment are arranged inside the tower 100, which is the enclosure carrying the wind power generation apparatus, and all of these generate electric energy loss in operation, and the loss is transformed into thermal energy which dissipates into the internal environment of the tower, to heat the air in the internal environment of the tower 100, thus the hot air is formed) to move entirely upwards at an accelerated speed (the hot airflow is subjected to co-action of its own lifting force and the air discharged from the air discharge openings 500b, and an stack effect). The hot airflow enters the hub via the power generator 300 or the nacelle 200 at the top of the tower 100, forms a positive pressure inside the hub, and passes by a pitch varying servo motor 901 and a surface of the electric control cabinet 903 of a pitch varying servo system, to generate convection heat exchange, and produce a cooling effect.

At the same time, the air after heat exchange, carrying heat, is squeezed out from the root of the rotor 400, and in the process of being squeezed out, it may in turn block rainwater or sand and dust carried by the upwind incoming flow from entering a flow guiding hood 902 (or entering the hub), which is equivalent to having a blocking function, to maintain a sound sealed internal environment. When the airflow is squeezed out from the root of the rotor 400, the speed of the airflow may reach 0.5 m/s or so, and in the case of sand-dust airflow, the speed may increase to 1 m/s, which is sufficient to play the aforementioned blocking role without adversely affecting the rotor circumferential force applied by the upwind incoming flow on the rotor 400.

The above-mentioned sand-dust airflow is formed because that, on the wind farms without vegetation to cover the ground, such as wind farms in drought or desert areas, solid particles, including sand or dust, may be carried in the airflow. The solid particles may enter the hub at the roots of the blades, which causes pollution, adversely affects heat dissipation of the electric equipment, and adversely affects the lubrication life of the bearing of the shafting of rotating components. Therefore, it is necessary to try to prevent the sand-dust airflow from entering the internal space of the hub, and in this case, the rising hot airflow just accomplishes this function.

In view of this, after being suctioned from the suction cavity is discharged from the bottom of the tower 100, the airflow also functions to cool the pitch varying system by heat exchange and block impurities from entering the pitch varying system. For facilitating the discharged airflow rising inside the tower 100 relatively uniformly, an air discharge conflux main pipe 503 may be provided. The air discharge conflux main pipe 503 is arranged in an annular shape, and is provided with multiple air discharge openings 500b uniformly distributed in the circumferential direction, thus, the air can be discharged uniformly in a larger range, and a transport pipeline 502 is formed between the air suction machine 501 and the air discharge conflux main pipe 500b. As shown in FIG. 4, after being gathered at the bottom of the tower 100, the discharged airflow rises upwards and is discharged by squeezing, to form a path K.

In addition, the discharged airflow itself is the air suctioned from the suction cavity, that is, the air outside the tower 100 suctioned from the suction through holes 100a, the airflow is airflow having a natural ambient temperature. In the process of being gathered at the bottom of the tower 100 and being pushed to rise upwards, the airflow exchanges heat with the heat generating equipment and elements inside the tower 100 to cool them, which is equivalent to introducing an external "cold source" to cool down the inside of the tower 100, and squeeze out the hot air inside the tower. For a long time, the inventors view the process that the rotor rotates to do work passively in the perspective of the essence of the second law of thermodynamics (that is, the conditions for the conversion from low-quality energy to high-quality energy, and the way to improve the quality of energy), and the solution in this embodiment is established in the action of the guiding concept of the second law of thermodynamics on the irreversible energy loss in the process of energy conversion.

It is mentioned above to filter the suctioned airflow, here, with the filtered airflow, the components at the top of the tower 100 and inside the tower 100 such as the nacelle 200 may be prevented from being damaged by impurities in the rising process of the airflow.

It can be seen that, the airflow at the boundary layer at the outer surface of the tower 100 is suctioned to the inside of the tower 100 according to this embodiment, such that not only the tower shadow effect can be weakened or eliminated and the vortex-induced vibrations caused by the detachment of the boundary layer can be prevented, but also a cold source of external air can be introduced for cooling by heat exchange. It should be understood that, the airflow suctioned by the suction apparatus may also not be discharged to the inside of the tower 100, but be discharged outside. Or, it may be configured that the air can be discharged through the air discharge openings 500b both to the outside of the tower 100 and to the inside of the tower 100. In this way, when the outside airflow cannot have a cooling effect due to a high temperature, it can be discharged to the outside. Of course, in addition to cooling, the effect of pushing the hot airflow inside the tower 100 out and the effect of blocking achieved by the formed positive airflow are also factors that may be taken into consideration when choosing to discharge the airflow to the outside or the inside.

The suction apparatus may further be equipped with a dehumidifier to dehumidify the air suctioned from the suction through holes 100a, that is, to obtain dry airflow, so that when the dry airflow is squeezed to be discharged from the inside of the tower 100 or from the top of the tower 100, other electrical elements may be prevented from being damaged.

The dehumidifier may be arranged in a bypass, i.e., the air suctioned from the suction through holes 100a can be dehumidified by the dehumidifier in the process of being discharged, and can also be directly discharged by bypassing the dehumidifier in a dry season or in a dry environment.

With the tower 100 and the method according to the above embodiments, the adverse effects of the tower shadow effect can be weakened or eliminated. The vertex-induced vibrations may also be suppressed. Compared with the method of the spiral wire mentioned in the background technology, obviously, the method of suctioning the suction through holes 100a to adsorb the boundary layer directly suppresses or prevents the cause of the vortex-induced vibrations and has a better vibration suppression effect. In addition, the suction intensity may be adjusted at any time during suctioning according to the vibration state, thus achieving a higher flexibility without the requirement of a higher cost. Moreover, compared with the noise generated when the upwind incoming flow comes into contact with the spiral wire in the background technology, obviously, the noise generated in suctioning the suction through holes 100a may be significantly reduced, and can meet the requirements of ecological regulations. Furthermore, the suction method can always function to suppress the vortex-induced vibrations whether in the process of hoisting or in the process of operation of the wind turbine generator system. In the case that the suctioned airflow is discharged towards the inside of the tower, above-described functions of cooling by heat exchange and blocking may be achieved. The suctioned airflow may have certain cooling and blocking functions even if it is not discharged from the bottom, as long as it is discharged to the inside of the tower. And in the case that the suctioned airflow is discharged from the bottom, the cooling and blocking effects may be better due to the lifting and pushing effects of the suctioned airflow.

It should be noted that, for the tower 100 provided with the suction through holes 100a in the circumferential direction, the suction may be performed only to the windward side, or only to the position of the bypassing flow detachment, or only to the above two positions, and may also be performed to the overall circumferential direction.

The above-described embodiments are only preferred embodiments of the present application, and it should be noted that for those skilled in the art, several improvements and modifications can be made without departing from the principle of the present application, and these improvements and modifications should also be deemed to fall into the scope of protection of the present application.

The invention claimed is:

1. A tower, comprising:
   suction through holes extending through a circumferential wall of the tower, wherein the suction through holes are distributed in a circumferential direction of the tower;
   a suction apparatus configured to perform suction to the suction through holes from outside to inside;
   a shell arranged in the tower, wherein a closed annular suction cavity is enclosed by the shell and an inner surface of a region of the tower provided with the suction through holes, and partitions are further arranged in the suction cavity so that the suction cavity is divided into a plurality of suction chambers by the partitions; and
   a controller configured to control the suction apparatus to suction at least a first one of the plurality of suction chambers corresponding to a windward side of the tower.

2. The tower according to claim 1, wherein the suction apparatus is configured to suction at least the first one of the plurality of suction chambers in the suction cavity to implement the suction to the suction through holes from outside to inside.

3. The tower according to claim 2, wherein the plurality of suction chambers are distributed in the circumferential direction.

4. The tower according to claim 3, further comprising a wind direction sensor, wherein the controller is configured to determine the windward side according to a wind direction detected by the wind direction sensor, and further determine at least the first one of the plurality of suction chambers corresponding to the windward side.

5. The tower according to claim 3, wherein an upwind incoming flow forms a bypassing flow detachment when flowing around the tower, and the suction apparatus is configured to further suction at least a second one of the plurality of suction chambers corresponding to a position of the bypassing flow detachment.

6. The tower according to claim 5, wherein the tower is further provided with a plurality of temperature sensing elements or pressure sensing elements distributed in the circumferential direction of the tower; the temperature sensing elements are configured to detect a temperature of a boundary layer of airflow at an outer surface of the tower, and the controller is configured to obtain the position of the bypassing flow detachment according to the temperature of the boundary layer; the pressure sensing elements are configured to detect a pressure at the outer surface of the tower, and the controller is configured to determine the windward side according to a variation of the pressure.

7. The tower according to claim 6, wherein the tower is provided with a temperature sensing channel or a pressure sensing channel extending through the circumferential wall of the tower, the temperature sensing element is arranged in the temperature sensing channel, and the pressure sensing element is arranged in the pressure sensing channel.

8. The tower according to claim 7, wherein a thermal insulation layer is provided between the temperature sensing element and an inner wall of the temperature sensing channel; a predetermined distance is provided between the temperature sensing element and an outer end opening of the temperature sensing channel, and the predetermined distance ranges from 15 mm to 25 mm.

9. The tower according to claim 3, wherein the suction apparatus has a plurality of suction openings corresponding to the plurality of suction chambers respectively, and a switch valve is provided between each of the suction openings and a corresponding suction chamber; responsive to the suction apparatus being controlled by the controller to suction the corresponding suction chamber, the controller is configured to control one or more switch valves corresponding to one or more other suction chambers to be switched off; and the suction apparatus comprises a suction conflux main pipe and an air suction machine, and the suction openings are in communication with the air suction machine via the suction conflux main pipe.

10. The tower according to claim 9, further comprising a wind speed sensor and a wind direction sensor configured for obtaining a first estimated position of the bypassing flow detachment and a first estimated windward side;

the tower is further provided with a plurality of temperature sensing elements or pressure sensing elements distributed in the circumferential direction of the tower; the temperature sensing elements are configured to detect a temperature of a boundary layer of airflow at an outer surface of the tower to obtain a second estimated position of the bypassing flow detachment, and the pressure sensing elements are configured to detect a pressure at the outer surface of the tower to obtain a second estimated windward side according to a variation of the pressure;

the controller is configured to determine a position of the bypassing flow detachment according to the second estimated position of the bypassing flow detachment obtained by the temperature sensing elements and the first estimated position of the bypassing flow detachment obtained by the wind speed sensor and the wind direction sensor, and the controller is configured to determine the windward side according to the second estimated windward side obtained by the pressure sensing elements and the first estimated windward side obtained by the wind direction sensor; and the controller is configured to control the suction apparatus to start, and at least a first switch valve corresponding to the windward side and at least a second switch valve corresponding to the position of the bypassing flow detachment are controlled to be switched on, and one or more remaining switch valves are controlled to be switched off; and the suction through holes are provided in an upper part of the tower.

11. The tower according to claim 1, wherein an air outlet of the suction apparatus is located at a bottom in the tower; and the suction apparatus comprises an air discharge conflux main pipe which is annular, and airflow suctioned by the suction apparatus is discharged via the air discharge conflux main pipe; or an air filtration section is provided between the suction cavity and the suction opening of the suction apparatus; or the suction apparatus comprises a dehumidifier configured to dehumidify the airflow suctioned from the suction through holes.

12. The tower according to claim 1, wherein the suction apparatus is configured to suction at least one of the suction through holes corresponding to at least the first one of the plurality of suction chambers at the windward side of the tower from outside to inside.

13. The tower according to claim 12, wherein a bottom of the region provided with the suction through holes is flush with or slightly lower than a lowermost point of a blade at a top of the tower; and the tower is further provided with an angle measuring sensor, for detecting whether the blade at the top of the tower sways to a convergent-divergent space; the convergent-divergent space is a space formed between the blade and an outer wall of the tower when the blade passes by a direct front side of the tower.

14. A method for suppressing a tower shadow effect of a tower, comprising:

providing suction through holes extending through a circumferential wall of the tower in a circumferential direction of the tower, wherein a closed annular suction cavity is enclosed by a shell of the tower and an inner surface of a region of the tower provided with the suction through holes, and partitions are further arranged in the suction cavity so that the suction cavity is divided into a plurality of suction chambers by the partitions; and performing suction to the suction through holes from outside to inside by controlling a suction apparatus to suction at least a first one of the plurality of suction chambers corresponding to a windward side of the tower.

15. The method for suppressing the tower shadow effect of the tower according to claim 14, comprising: performing suction to at least one of the suction through holes corresponding to at least the first one of the plurality of suction chambers at the windward side of the tower.

16. The method for suppressing the tower shadow effect of the tower according to claim 15, comprising:

detecting whether a blade at a top of the tower sways to a convergent-divergent space, wherein the convergent-divergent space is a space formed between an outer wall of the tower and the blade when the blade passes by a direct front side of the tower; and when the blade enters the convergent-divergent space, suctioning the at least one of the suction through holes at the windward side of the tower.

17. The method for suppressing the tower shadow effect of the tower according to claim 15, comprising:

suctioning at least a second one of the suction through holes at a position corresponding to a position of a bypassing flow detachment which is formed when an upwind incoming flow flows around the tower, wherein the position of the bypassing flow detachment is determined by:

detecting a temperature of a boundary layer at an outer surface of the tower in the circumferential direction of the tower to obtain a first estimated position of the bypassing flow detachment; and detecting a wind speed and a wind direction of an environment where the tower is located to obtain a second estimated position of the bypassing flow detachment, and performing mutual authentication between the second estimated position of the bypassing flow detachment obtained according to the wind speed and the wind direction and the first estimated position of the bypassing flow detachment obtained according to the temperature of the boundary layer to determine the position of the bypassing flow detachment.

18. The method for suppressing the tower shadow effect of the tower according to claim 15, comprising:
    detecting a pressure at an outer surface of the tower in the circumferential direction of the tower, and obtaining a first estimated windward side according to a variation of the pressure;
    detecting a wind direction of an environment where the tower is located to obtain a second estimated windward side, and performing mutual authentication between the second estimated windward side obtained from the wind direction of the environment of the tower and the first estimated windward side obtained according to the variation of the pressure to determine the windward side; and
    feeding back a situation of elimination of the tower shadow effect according to the variation of the pressure.

19. The method for suppressing the tower shadow effect of the tower according to claim 14, comprising:
    discharging a suctioned airflow to a bottom in the tower; and
    rising and boosting an airflow inside the tower by the discharged airflow to form a positive pressure in a flow guiding hood or a hub at the top of the tower to form a sealed environment.

20. A wind power generation apparatus, comprising:
    a tower comprising:
        suction through holes extending through a circumferential wall of the tower, wherein the suction through holes are distributed in a circumferential direction of the tower;
        a suction apparatus configured to perform suction to the suction through holes from outside to inside;
        a shell arranged in the tower, wherein a closed annular suction cavity is enclosed by the shell and an inner surface of a region of the tower provided with the suction through holes, and partitions are further arranged in the suction cavity so that the suction cavity is divided into a plurality of suction chambers by the partitions; and
        a controller configured to control the suction apparatus to suction at least one of the plurality of suction chambers corresponding to a windward side of the tower;
    a nacelle coupled to the tower and located at a top of the tower;
    a generator coupled to the nacelle and located at the top of the tower; and
    a rotor coupled to the generator and located at the top of the tower.

* * * * *